United States Patent
Hegwein et al.

(10) Patent No.: US 12,546,148 B2
(45) Date of Patent: Feb. 10, 2026

(54) LOCKING DEVICE FOR LOCKING CHARGING, FUELING, OR SERVICE FLAPS

(71) Applicant: ILLINOIS TOOL WORKS INC., Glenview, IL (US)

(72) Inventors: Matthias Hegwein, Ippesheim (DE); Zsolt Wilke, Bad Mergentheim (DE); Andreas Rudolf, Würzburg (DE); Roland Och, Rottendorf (DE); Thomas Lechner-Watzlik, Aub (DE); Matthias Kapaun, Gaukönigshofen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 586 days.

(21) Appl. No.: 17/989,378

(22) Filed: Nov. 17, 2022

(65) Prior Publication Data

US 2023/0151651 A1 May 18, 2023

(30) Foreign Application Priority Data

| | | |
|---|---|---|
| Nov. 18, 2021 | (DE) | 10 2021 130 171.8 |
| Jan. 20, 2022 | (DE) | 10 2022 101 333.2 |
| May 13, 2022 | (DE) | 10 2022 112 085.6 |
| Jul. 5, 2022 | (DE) | 10 2022 116 710.0 |
| Aug. 22, 2022 | (DE) | 10 2022 121 106.1 |

(51) Int. Cl.
*E05B 83/34* (2014.01)
*B60K 15/05* (2006.01)

(52) U.S. Cl.
CPC ............. *E05B 83/34* (2013.01); *B60K 15/05* (2013.01)

(58) Field of Classification Search
CPC ............ B60K 15/05; B60K 2015/0515; B60K 2015/053; B60K 2015/0538; B60K 2015/0561; E05B 83/34
USPC ....................................... 296/97.22
See application file for complete search history.

(56) References Cited

U.S. PATENT DOCUMENTS

| | | | |
|---|---|---|---|
| 5,664,811 A | 9/1997 | Martus et al. | |
| 5,906,406 A | 5/1999 | Pajakowski | |
| 10,507,726 B2 * | 12/2019 | Yang | B60K 15/05 |
| 10,723,222 B2 * | 7/2020 | Jeon | B60K 15/05 |
| 11,927,045 B2 | 3/2024 | Wietkamp et al. | |
| 2008/0258552 A1 | 10/2008 | Tseng | |

(Continued)

FOREIGN PATENT DOCUMENTS

| | | |
|---|---|---|
| DE | 102008019351 A1 | 1/2009 |
| DE | 102008057933 B4 | 7/2010 |

(Continued)

*Primary Examiner* — Jason S Daniels

(57) ABSTRACT

A locking device enables locking a charging, fueling, or service flap on a compartment. The flap is reversibly movable between a closed position and an open position. The locking device includes a flap lock for locking the flap in its closed position. The flap lock has a locking position, in which the flap lock locks the flap, and a release position in which the flap is moveable in relation to the flap lock. A first transfer shaft is connected to the flap lock such that the flap lock is moveable by a movement of the first transfer shaft between the locking position and the release position. A pushing element is connected to the first transfer shaft and configured so as to push the flap out of its closed position away from the charging compartment after the flap lock is transferred into its release position.

19 Claims, 18 Drawing Sheets

(56) References Cited

U.S. PATENT DOCUMENTS

| | | |
|---|---|---|
| 2011/0174102 A1 | 7/2011 | Beck |
| 2012/0222356 A1 | 9/2012 | Beck |
| 2014/0084599 A1 | 3/2014 | Beck |
| 2015/0061314 A1 | 3/2015 | Beck |
| 2015/0217638 A1* | 8/2015 | Chiba ............ F16J 15/10 296/97.22 |
| 2020/0095810 A1* | 3/2020 | Lee ............ E05B 83/34 |
| 2022/0186542 A1 | 6/2022 | Wietkamp et al. |
| 2023/0061574 A1* | 3/2023 | Mensch ............ E05F 1/10 |
| 2024/0001760 A1* | 1/2024 | Tani ............ B60K 15/05 |

FOREIGN PATENT DOCUMENTS

| | | |
|---|---|---|
| DE | 102009060119 A1 | 6/2011 |
| DE | 102011101838 A1 | 11/2012 |
| DE | 102012004078 A1 | 9/2013 |
| DE | 102019128551 A1 | 4/2020 |
| DE | 102024126658 A1 | 3/2025 |
| EP | 0820890 A2 | 1/1998 |
| EP | 0736406 B1 | 5/2000 |
| EP | 0872371 B1 | 10/2001 |
| EP | 0800465 B1 | 5/2002 |
| EP | 0822108 B1 | 11/2003 |
| EP | 0990548 B1 | 11/2004 |
| EP | 1557313 A3 | 3/2006 |
| EP | 1281558 B1 | 3/2011 |
| GB | 2631930 A | 1/2025 |
| WO | 2025026482 A1 | 2/2025 |

* cited by examiner

LOCKING DEVICE FOR LOCKING CHARGING, FUELING, OR SERVICE FLAPS

TECHNICAL FIELD

The present invention relates generally to locking devices for locking covers in or on a housing, in particular of a vehicle body. Specifically, the invention relates to locking mechanisms for actuating a cover, in particular configured as a charging fueling, or service flap, in a charging, fueling, or service compartment that is received or receivable on or in a body component of a vehicle.

Furthermore, the invention relates to a corresponding system having a cover, in particular in the form of a charging, fueling, or service flap, and a charging, fueling, or service compartment, which is received or receivable on or in a body component of a vehicle, wherein the cover (i.e., the charging, fueling, or service flap in particular) is reversibly movable between a closed position and an open position relative to the charging, fueling, or service compartment and wherein a locking device is provided for locking a charging, fueling, or service flap.

Finally, the invention further relates to a vehicle having such a system.

BACKGROUND

The vehicle is in particular a vehicle having a hybrid or electric drive, wherein however vehicles having a purely combustion-based drive are not excluded in the context of the present invention.

Vehicles with a hybrid or electric drive usually have one battery or traction battery, which, for example in the case of PHEV vehicles (PHEV=plug-in hybrid electric vehicle) or BEV vehicles (BEV=battery electric vehicle), can be charged via an electrical charging connector that is accessible from the outside on the vehicle body, and is typically a charging port, by connecting to an electrical charging station, for example, or a conventional external electrical terminal.

The charging port is usually arranged in a charging compartment of the vehicle body, which is covered or closed by a charging flap or a charging closure element. A mechanism that cooperates with the charging flap or charging closure element selectively allows the charging compartment to be opened and closed or the charging flap or charging closure element to be flipped open and closed relative to the charging compartment, and thus allows access to the charging port.

In vehicles with a combustion-based drive, a fuel tank is supplied with fuel via a tank filler-neck, which is accessible from the outside by connection to a fuel pump or a fuel nozzle, for example. Like the charging port, the filler neck is typically arranged in a filler neck housing that is associated with the vehicle body and is covered or closed by a fueling flap or a tank closure element. Here, too, a mechanism that cooperates with the fueling flap or tank closure element selectively allows the fueling compartment to be opened and closed or the fueling flap or tank closure element to be flipped open and closed relative to the fueling compartment, and thus allows access to the tank filler-neck.

The terms "fueling flap" and "fueling compartment" as used herein are not understood to mean only the components associated with a fuel tank or the components necessary for filling a fuel tank. Rather, these terms are also intended to include components for a tank for receiving other resources, for example AdBlue or urea, or an additive such as water. Accordingly, the invention also relates to actuating mechanisms for actuating service flaps associated with a filling system for a resource or additive tank, in particular a fuel, AdBlue, or water tank.

Actuating mechanisms and actuating apparatuses for opening and closing a cover in or on a vehicle are generally known from the prior art, for example from DE 10 2008 057 933 B4, DE 10 2009 060 119 A1, DE 10 2011 101 838 A1, and DE 10 2012 004 078 A1.

In the prior art, however, there is a fundamental need for charging, fueling, or service compartment systems in which a plurality of functions must be switched and actuated in a coordinated manner. These functions include, in particular, the unlocking and locking or releasing and blocking of the cover or charging, fueling, or service flap with the aid of a flap lock, moving the unlocked charging, fueling, or service flap relative to the charging, fueling, or service compartment such that the charging, fueling, or service flap is transferable from a closed position into an open position (and vice versa), and other functions such as enabling or disabling a light source for illuminating at least one region of the charging, fueling, or service compartment in its open state.

These different functions or functional components of the charging, fueling, or service compartment system must be controlled or manipulated in coordination with respect to time. For example, during a charging operation, it is first necessary to unlock the charging, fueling, or service flap in its closed position with the aid of the flap lock of the charging, fueling, or service compartment system, wherein the charging, fueling, or service flap can be moved relative to the charging, fueling, or service compartment only after the unlocking of the charging, fueling, or service flap in order to transfer it into the open state. Only then can the charging port or charging connector be connected and thereafter locked.

In order to manipulate and coordinate these functions or functional components, it is common to associate multiple actuators with the charging, fueling, or service compartment system, wherein each actuator takes over the actuation of a correspondingly associated functional component, such as triggering the flap lock and moving the unlocked charging, fueling, or service flap relative to the charging, fueling, or service compartment. In order to coordinate the actuation of the various functional components of the charging, fueling, or service compartment system, a control device is typically used, which triggers the respective actuators in a coordinated manner.

On the other hand, such charging, fueling, or service compartment systems, particularly during charging, are subjected to a variety of weather conditions, which can lead to sealing problems due to the functional components mentioned above. Individual components such as the charging, fueling, or service flap, can also become iced.

SUMMARY

Accordingly, the underlying problem of the invention is to further develop a locking device for charging, fueling, or service flap(s) in such a way that it has a relatively small construction space requirement, wherein at the same time several functions or functional components of the charging or fueling compartment system can be controlled in a reliable and coordinated manner. In addition, the aim is for the locking device to remain usable even when the charging, fueling, or service flap becomes iced.

This underlying problem of the invention is solved in particular by the subject matter of the independent claim 1, wherein advantageous further developments of the actuating mechanism according to the invention are specified in the dependent claims.

Accordingly, the invention relates to a locking device for locking a charging, fueling, or service flap on one of a charging, fueling, or service compartment received or receivable on or in a housing, in particular a body component of a vehicle, wherein the charging, fueling, or service flap is reversibly movable, and in particular pivotable, between a closed position and an open position relative to the charging, fueling, or service compartment, wherein the locking device comprises the following

- a flap lock for locking the charging, fueling, or service flap in its closed position, wherein the flap lock has a locking position, in which the flap lock locks the charging, fueling, or service flap, and a release position in which the charging, fueling, or service flap is moveable in relation to the flap lock;
- a first transfer shaft connected to the flap lock such that the flap lock is moveable, in particular pivotable, by a movement, in particular a rotation, of the first transfer shaft between the locking position and the release position;
- a pushing element connected to the first transfer shaft and configured so as to push the charging, fueling, or service flap out of its closed position away from the charging compartment after the flap lock is transferred into its release position.

By connecting the pushing element and the flap lock to a common first transfer shaft, a synchronized unlocking and pushing out of the charging, fueling, or service flap can be achieved. The pushing element serves primarily to also push out the charging, fueling, or service flap against a resistance. Thus, any icing of the charging, fueling, or service flap can preferably also be broken up by the pushing element. With the synchronization via the first transfer shaft, it is also achieved that the charging, fueling, or service flap can only be pushed out when the lock has been transferred into its release position and thus releases the flap. Thus, it generally cannot occur that the pushing element will push against the charging, fueling, or service flap while it is still locked by the flap lock.

According to a further embodiment, the flap lock can be transferred from its locking position into its release position by a movement, in particular a rotation, of the first transfer shaft in a first direction. For this purpose, as will be explained in further detail below, the flap lock can comprise a locking hook, which is arranged directly on the first transfer shaft.

According to a further embodiment, the pushing element is configured so as to push the charging, fueling, or service flap out of its closed position away from the charging, fueling, or service compartment when the first transfer shaft is further moved, in particular rotated, in the first direction upon reaching the release position of the flap lock. Thus, no other movement of the first transfer shaft is needed in order to push the charging, fueling, or service flap with the pushing element in the direction of its open position. Rather, this is automatically achieved by continuing to rotate the first transfer shaft after unlocking the flap. According to an exemplary embodiment, the pushing element can also be attached directly on the first transfer shaft.

According to a further embodiment, the pushing element and the flap lock are integrally formed. In other words, the locking device according to the invention can comprise a single component for locking and pushing out the fueling, charging, or service flap. This can be attached to the first transfer shaft with a single opening. According to a further embodiment, the space requirement of the locking device is particularly low. Of course, it is also conceivable to design the pushing element and the flap lock as separate parts.

According to a further embodiment, the flap lock is configured as a locking hook, wherein the locking hook is configured so as to be operatively engaged with the charging, fueling, or service flap, in particular with a locking element of the charging, fueling, or service flap, in the locking position, preferably in a friction-locking manner. By using a locking hook, the service flap can be easily secured against undesired pivoting, for example during travel. However, other types of flap locks, such as bolts or the like, are also conceivable.

According to a further embodiment, the locking device comprises a biasing element, in particular in the form of a spring, via which the flap lock is biased into the locking position. In other words, in the resting position of the locking device, the charging, fueling, or service flap is locked in its closed position by the flap lock. Accordingly, no energy expenditure is required in order to lock the flap, so that the flap is securely locked even if a drive connected to the first transfer shaft should fail.

According to a further embodiment, the flap lock is arranged such that the flap lock moves in the direction of its release position when the charging, fueling, or service flap is transferred into the closed position, counter to the biasing of the biasing element, and moves into its locking position when the biasing position is reached due to the biasing of the biasing element. In other words, the flap lock is configured such that the biasing by the biasing element does not inhibit the transfer of the charging, fueling, or service flap from the open position into the closed position. Rather, the flap lock is configured so as to move temporarily out of its locking position when the charging, fueling, or service flap is moved into the closed position.

According to a further aspect, the present invention relates to an actuating mechanism for actuating a charging, fueling, or service flap on a charging, fueling, or service compartment received or receivable on or in a body component of a vehicle, wherein the charging, fueling, or service flap is reversibly movable, and in particular pivotable, between a closed position and an open position relative to the charging, fueling, or service compartment, wherein a locking device as described above is further provided. The actuating mechanism comprises the following:

- a drive, in particular in the form of an electric motor, for driving the first transfer shaft; and
- a kinematics associated with the drive and configured so as to tap a rotational movement of the drive when the drive is actuated and convert it into a first movement for manipulating, and in particular pivoting, the charging, fueling, or service flap and into a second movement for manipulating the flap lock.

Such an actuating mechanism can be used not only to lock the charging, fueling, or service flap and to push it out in the event of icing, but also to actively move the charging, fueling, or service flap between the closed position and the open position. The kinematics is configured so as to synchronize the movement of the flap lock and the charging, fueling, or service flap with one another.

According to a further embodiment, the kinematics is configured so as to tap the rotational movement of the drive for the first movement to open the charging, fueling, or service flap only when the flap lock has been transferred into its release position by the second movement.

Thus, it is prevented that the drive will attempt to open the charging, fueling, or service flap while the flap lock is still in its locking position. Only when the flap lock is unlocked, that is to say it has been transferred into its release position, the kinematics converts the rotational movement of the drive into a movement for opening the charging, fueling, or service flap.

According to a further embodiment, the kinematics is configured so as to transfer the rotational movement of the drive to the first transfer shaft in order to move the flap lock between the locking position and the release position, wherein the actuating mechanism comprises a second transfer shaft, which can be connected to the charging, fueling, or service flap in such a way that the charging, fueling, or service flap is movable, in particular pivotable, between the closed position and the open position by a rotation of the second transfer shaft, and wherein the kinematics is configured so as to transfer the rotational movement of the drive to the second transfer shaft. The actuating mechanism of this embodiment has a kinematics that can selectively transfer the kinetic energy of the drive to two different transfer shafts. The first transfer shaft is used in order to actuate the flap lock and the pushing element, as described in further detail above. The second transfer shaft serves to move the charging, fueling, or service flap between the open and closed positions. Thus, for example, it can also be achieved that the flap lock and the charging, fueling, or service flap can be moved, and in particular pivoted, at different speeds.

According to a further embodiment, the kinematics comprises an overload coupling which decouples the drive from the second transfer shaft as soon as a resistance against the first movement exceeds a threshold value, and wherein the kinematics is configured so as to continue transferring the rotational movement of the drive to the first transfer shaft in the event that the threshold value is exceeded. According to this design variant, an unintended opening of the charging, fueling, or service flap against too high a resistance is prevented, whether due to icing or a non-closing flap lock.

According to a further embodiment, the kinematics comprises a flexible tensile element, in particular a Bowden cable, for manipulating the flap lock. By using a flexible tensile element, for example a Bowden cable, to manipulate the flap lock, it is possible to attach the drive shaft at substantially any position in relation to the charging, fueling, or service flap. For example, the drive shaft can accordingly be positioned in an ideal position in relation to a pivot arm of the charging, fueling, or service flap, wherein the flap lock, which is often positioned opposite the pivot arm, can be easily reached by the flexible tensile element. The flap lock is thus also not bound to the position of the pivot axis of the charging, fueling, or service flap. Also, by using a flexible tensile element, the flap lock can be connected to the drive in a particularly simple and space-saving manner.

According to a further embodiment, the kinematics is configured such that the first movement is mechanically synchronized with the second movement. It can thus be prevented, for example, that an opening movement of the charging, fueling, or service flap occurs due to the first movement while the flap lock is still in its locking position. The mechanically configured synchronization is particularly reliable and does not rely on sensors, as is the case with an electronic synchronization, for example.

In one design variant, which will be explained in detail below, this can be achieved, for example, via a combination of gears and a cam washer. Alternatively, only a single coupling element can be connected to a drive shaft of the electromotive drive, which drives the two movements in a synchronized manner. For example, this can be a single cam washer having different cams for converting the kinetic energy into the first and second movements, respectively. Such a cam washer can also transfer different torques at different rotational points, wherein a first torque is only sufficient to move the Bowden cable, i.e., to generate the first movement, while a second torque, after a rotation of the cam washer about a predetermined rotational angle, is sufficient to also pivot the charging, fueling, or service flap. With such a changeability of the torque via the rotational angle of the cam washer, a synchronization of the first and second movement can also be achieved, because the flap cannot be pivoted by the first torque.

According to a further embodiment, the kinematics is configured so as to tap the rotational movement of the drive for the second movement to open the charging, fueling, or service flap only when the flap lock has been transferred into its release position by the second movement.

According to a further embodiment, the flexible tensile element is configured so as to transfer the rotational movement of the drive to a first transfer shaft of the flap lock, wherein the actuating mechanism comprises a second transfer shaft, which is connectable to the charging, fueling, or service flap in such a way that the charging, fueling, or service flap is movable, in particular pivotable, by a movement, in particular a rotation, of the second transfer shaft between the closed position and the open position, because the kinematics is configured so as to transfer the rotational movement of the drive to the second transfer shaft. In other words, due to the first movement, the rotational movement of the drive shaft is transferred to a first transfer shaft while, due to the second movement, the kinetic energy of the drive shaft is transferred to a second transfer shaft. The first transfer shaft can be connected to the flap lock while the second transfer shaft is connected to the pivot arm of the charging, fueling, or service flap. Thus, with the actuating mechanism of the present invention the rotational movement of the drive shaft can be converted into separate rotational movements of the first and second transfer shafts, which can be operated with different gear ratios at different rotational speeds.

According to a further embodiment, the kinematics comprises a lever element attached to the first transfer shaft and connected to an end of the flexible tensile element remote from the drive, which lever element is configured so as to transfer a movement of the tensile element to the first transfer shaft. The lever element serves as a connecting link between the flexible tensile element and the first transfer shaft. Accordingly, depending on the configuration of the lever element, the torque transferred by the flexible tensile element to the first transfer shaft can be adjusted precisely. It is also conceivable to form the lever element such that the torque transferred to the first transfer shaft is variable, for example, as a function of the rotational angle of the lever element. In doing so, a comparatively small torque can first be used for opening the flap lock, which either continuously or suddenly increases in order to release a jam. As will be explained in further detail below, this can also be used in order to break up an icing of the flap.

According to a further embodiment, the lever element is biased into a first position corresponding to a locking position of the flap lock. Accordingly, the charging, fueling, or service flap is also reliably locked in the event of a fault.

According to a further embodiment, the kinematics comprises a cam washer connected to the drive shaft and a first end of the flexible tensile element, wherein the cam washer is configured so as to convert a rotation of the drive shaft into a tensile movement of the flexible tensile element. By directly connecting the cam washer to the drive shaft, important construction space can be saved.

A further aspect of the present invention relates to a charging, fueling, or service flap having any of the actuating mechanisms described above.

BRIEF DESCRIPTION OF THE DRAWINGS

The invention will be described in further detail below with respect to the embodiments shown in the figures.

The following are shown.

DETAILED DESCRIPTION

Figure 1:
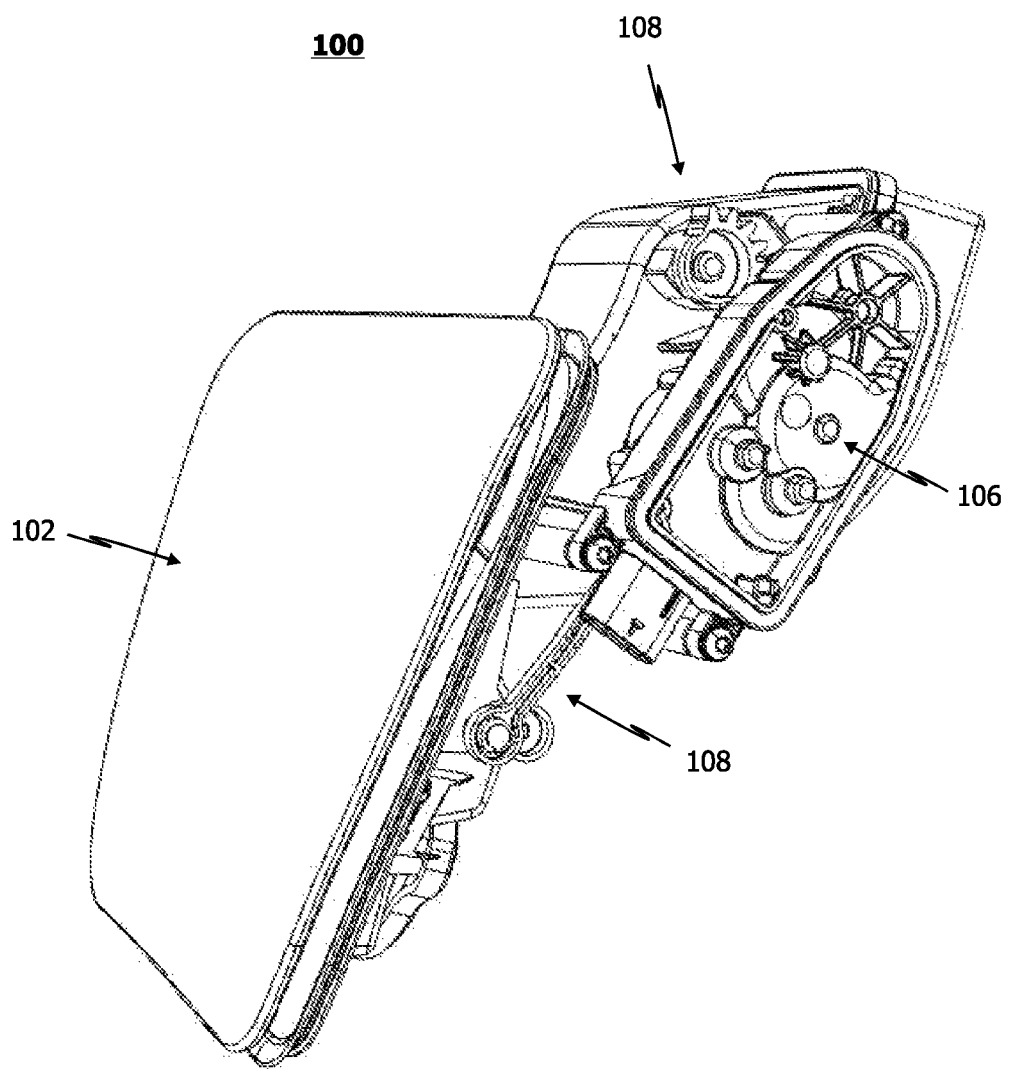
FIG. 1 a perspective view of an actuating mechanism having a flap according to a first embodiment.

FIG. 1 is a schematic perspective view of an actuating mechanism 100 according to one embodiment of the present invention. The actuating mechanism 100 serves on the one hand to actuate a cover shown herein as a charging flap 102. On the other hand, the actuating mechanism 100 is also configured so as to lock the charging flap 102 in its closed position (as shown in FIG. 1). Finally, icing of the charging flap 102 can be broken up by the actuating mechanism 100 on the associated charging, fueling, or service compartment (as illustrated in FIG. 8A, 8B).

The actuating mechanism 100 comprises a drive, in particular an electric drive 106, which is shown herein as an electric motor. A rotation of the electric drive 106 is transferred via a kinematics 108 to the corresponding movable elements of the actuating mechanism 100, such as a flap lock and a pivot arm for the charging flap 102.

Figure 2:
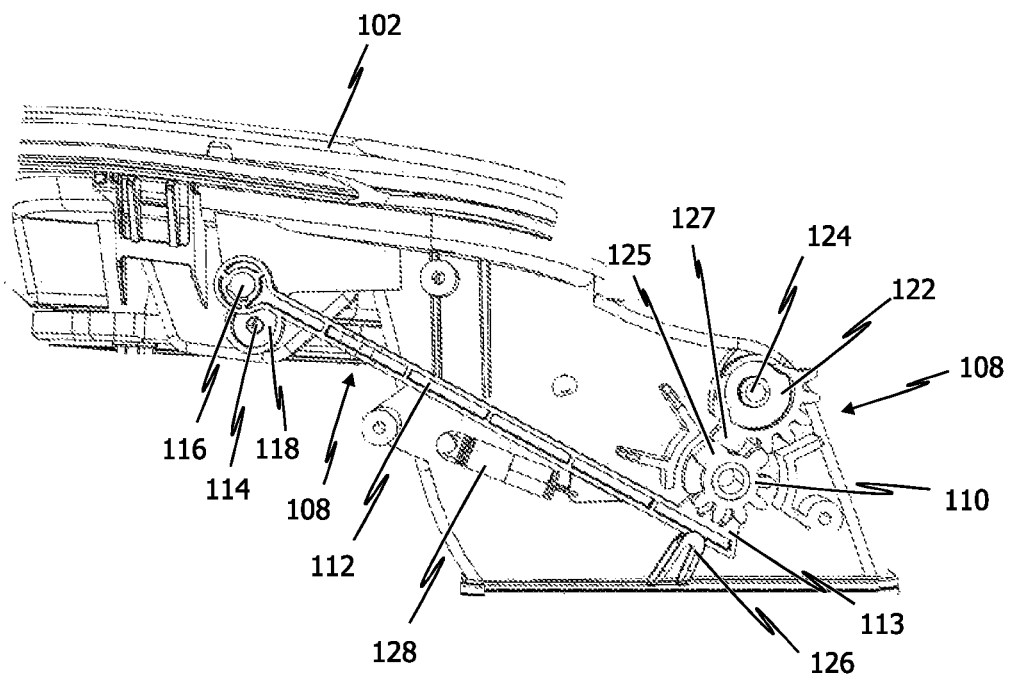
FIG. 2 a sectional view of the actuating mechanism according to FIG. 1.

A detailed view of the kinematics 108 of the actuating mechanism 100 can be seen in the sectional view according to FIG. 2. The kinematics 108 comprises a first pinion 110 connected to the electric drive 106 via a drive shaft 111. A rotation of the electric drive 106 can be transferred to the first pinion 110 via the drive shaft 111.

The first pinion 110 is connected to a gear rack 112. In particular, the first pinion 110 is connected to a first end 113 of the gear rack 112. For this purpose, the first end 113 of the gear rack 112 comprises one or more teeth that are operatively connected to corresponding teeth of the first pinion 110. By way of a resilient abutment bearing 126, which is shown by way of example, the first end 113 of the gear rack 112 is pressed against the pinion 110 such that it is operatively connected at all times to the teeth of the pinion 110.

At a second end 116 of gear rack 112 opposite to the first end 113, the gear rack 112 is rotatably connected to an eccentric washer 118. The eccentric washer 118 is connected to a first transfer shaft 114. The first transfer shaft 114 extends in particular into the interior of the charging, fueling, or service compartment 104, which is not shown in detail here.

The first pinion 110 is operatively connected to a second pinion 122. In particular, the second pinion 122 has one or more teeth operatively connected to corresponding teeth of the first pinion 110. The second pinion 122 is arranged substantially at a side of the first pinion 110 lying opposite the first end 113 of the gear rack 112.

The first and second pinions 110, 122 each have end stops 125, 127 that limit the maximum rotational angle of the pinions 110, 122. The first stop 125 of the first pinion 110 limits the maximum movement stroke, that is to say the maximum pivoting, of the flap lock. The second stop 127 of the second pinion 122 limits the maximum movement stroke, that is to say the maximum pivoting, of the charging flap 102.

The second pinion 122 is connected to a second transfer shaft 124 via an overload coupling, not shown here. The second transfer shaft 124 serves to transfer a rotational energy of the drive to a flap 102 in order to move it from its closed position into the open position and back.

Figure 3:
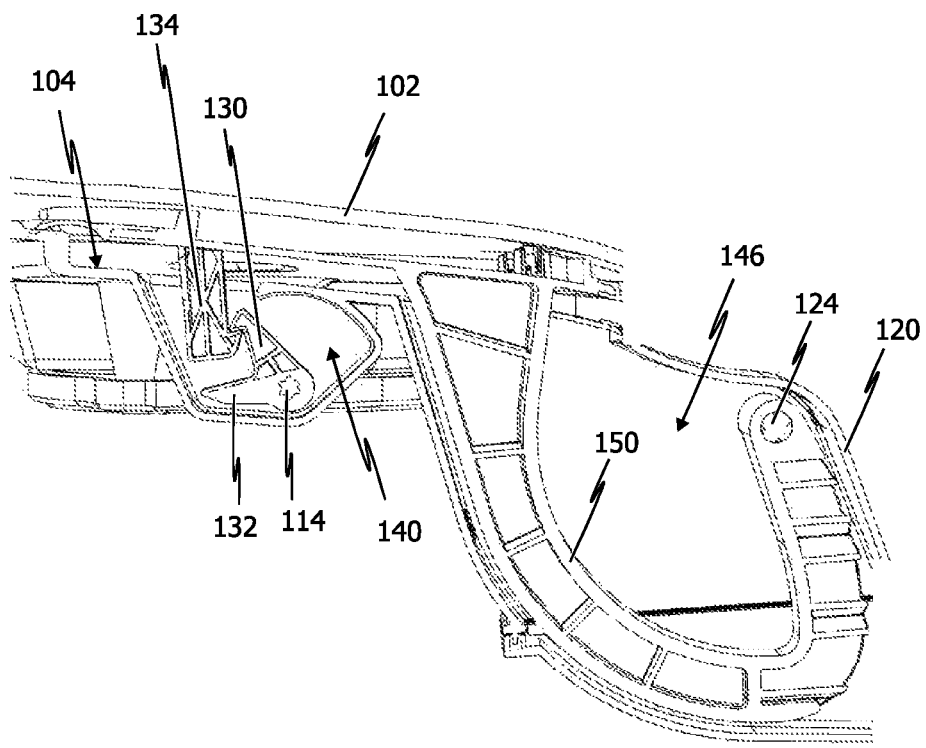
FIG. 3 a further sectional view of the actuating mechanism according to FIG. 1.

The kinematics 110 is biased into the position shown in FIG. 2. A biasing element 128 configured as a spring serves this purpose. The biasing element 128 is connected to a housing of the actuating mechanism 100 on the one hand and to the gear rack 112 on the other hand. As will be explained in further detail below, the resting position of the gear rack 112 shown in FIG. 2 corresponds to the locking position of flap lock 130 (FIG. 3). In other words, the biasing element 128 biases the flap lock 130 into its locking position.

FIG. 3 shows a cross-section through the housing 120 of the actuating mechanism 100. A charging compartment 104 is provided on a front side of the housing 120. Behind the charging compartment 104, that is to say on the side of the charging compartment 104 facing away from the charging flap 104, there is a first cavity 140 for receiving a flap lock 130 and a second cavity 146 for receiving a pivot arm 150.

The flap lock 130 received in the first cavity 140 is connected to the first transfer shaft 114 and has a locking position, shown in FIG. 3, in which the flap lock 130 locks the charging flap 102 in its closed position, shown in FIG. 3. For this purpose, the flap lock 130 is connected to a locking element 134 of the charging flap 102. In particular, the flap lock 130 and the locking element 134 are each locking hooks that are operatively connected to one another in the closed position of the flap lock. The charging flap is locked in the embodiment shown in FIG. 2, that is, an opening of the charging flap 102 in the locking position is not possible without damaging the flap lock 130. However, it is also generally conceivable to align the flap lock such that it merely locks the charging flap 102 so that an opening of the charging flap 102 is also possible in the locking position without damaging the flap lock.

As indicated above in connection with FIG. 2, the flap lock 130 is biased into the locking position shown in FIG. 3 by the biasing element 128. To unlock the flap lock and thus transfer the flap lock 130 into its unlocking position, the first pinion 110 is rotated by the drive 106 in a direction counterclockwise, as shown in FIG. 2. The first pinion 110 is operatively connected to teeth arranged at the first end 113 of the gear rack 112 such that, as the first pinion 110 rotates, the gear rack 112 is pulled counterclockwise in the direction of the first end 113. Via the second end 116, which is connected to the eccentric washer 118, such a pulling motion of the gear rack 112 is transferred to the first transfer shaft 114. Accordingly, the first transfer shaft 114 is rotated clockwise according to FIG. 2. In other words, a rotation of the first pinion 110 in one direction (for example, counterclockwise in FIG. 2) results in rotation of the first transfer shaft 114 in the opposite direction (for example, clockwise according to FIG. 2).

Returning to the illustration according to FIG. 3, it should be mentioned that a rotation of the first transfer shaft 114 in the clockwise direction also causes the flap lock 130 to be pivoted clockwise. In particular, the flap lock 130 is pivoted away from the locking element 134 of the charging flap 102 in the first direction shown as clockwise and into the interior of the first cavity 140.

By pivoting the flap lock 130 in the first direction, it is released from the locking element 134 and thus releases a movement of the charging flap 102. As soon as the flap lock 130, which is configured as a locking hook, is no longer in operative engagement with the locking element 134, the flap lock 130 has reached its release position. It should be noted that the flap lock 130 does not need to be fully rotated into the first cavity 140 in its release position. Rather, the release position of the flap lock 130 is already achieved when there is no longer any contact between the flap lock and the locking element 134.

The locking device further comprises a pushing element 132 configured so as to push the charging flap 102 out of the closed position shown in FIG. 2 away from the charging compartment 104 when the charging flap 102 is stuck in the closed position, for example when it has become iced. The pushing element is located on the first transfer element after the flap lock 130 has been moved into its release position. The pushing element 132 is also connected to the first transfer shaft 114. The pushing element is arranged on the first transfer shaft such that it only comes into contact with the locking element 134 after the flap lock 130 has already been transferred into its release position.

In particular, the pushing element 132 is formed integrally with the flap lock 130 according to the embodiment shown in the figures. Specifically, the flap lock 130 and the pushing element 132 each have a first end connected to one another and to the first transfer shaft 114.

The pushing element 132 and the flap lock 130 extend at an angle of about 90° to one another, according to the embodiment shown herein. Of course, however, it is just as conceivable to provide a larger or smaller angle. Specifically, the angle will depend on how long the pushing element 132 takes to push the charging flap 102 away from the charging compartment 104 after the flap lock 130 has reached the release position. The angle between the pushing element 132 and the flap lock 130 accordingly defines the delay between achieving the release position of the flap lock 130 and the pushing out of the charging flap 102 by the pushing element 132.

The angle between the pushing element 132 and the flap lock 130 is sized according to the illustrated embodiment such that, in normal operation, there is no contact between the pushing element 132 and the locking element 134. Rather, in normal operation, the charging flap is moved in the direction of the open position before the pushing element 132 has been rotated sufficiently far so as to contact the locking element 134, as will be explained in further detail below.

In a further embodiment (not shown), the flap lock and the pushing element can also be arranged offset from one another along the first transfer shaft, wherein the pushing element and the flap lock are still connected to and driven by the transfer shaft, respectively.

As noted above, the flap lock 130 can be transferred by a rotation in the first direction (here, clockwise) from the locking position shown in FIG. 3 into a release position in which the flap lock 130 is no longer in contact with the locking element 134 of the charging flap 102. If the first transfer shaft 114 is moved further in the first direction (i.e., clockwise according to FIG. 3) upon reaching the release position of the flap lock 130, the flap lock 130 is pivoted even further into the interior of the first cavity 140. By rotating the transfer shaft 114 further, the pushing element 132 further moves in the direction of a face of the locking element 134 of the charging flap 102, wherein the pushing element preferably moves the locking element 134 only in case of icing (or sticking) of the charging flap, as will be explained in further detail below.

Figure 4:
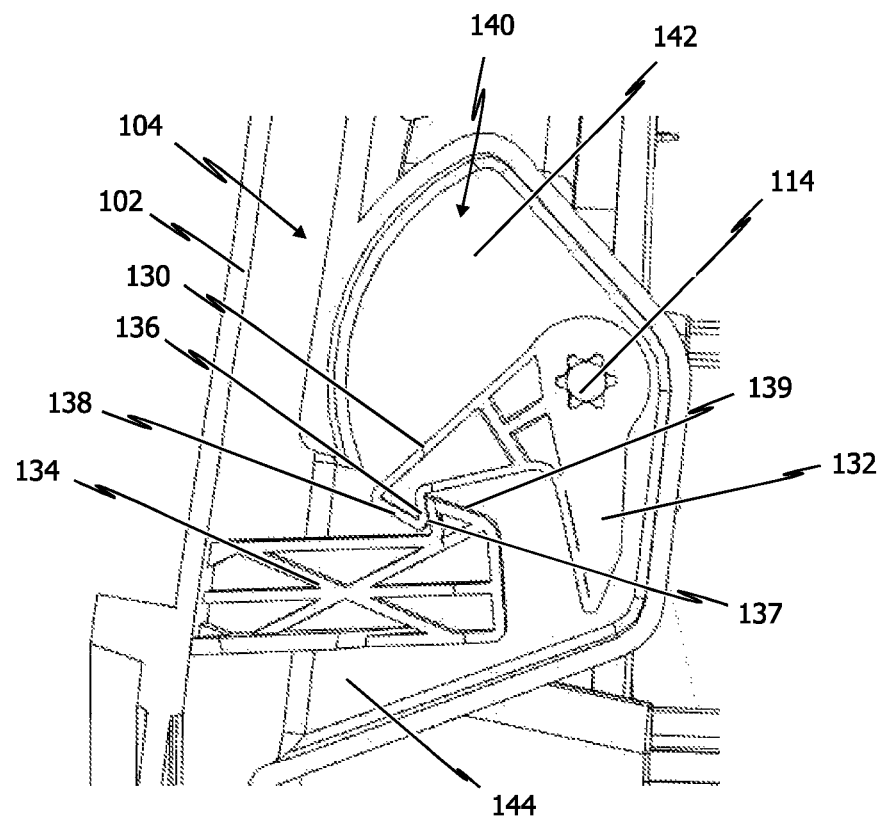
FIG. 4 an enlarged view of a region of the sectional view according to FIG. 3.

FIG. 4 shows an enlarged view of the first cavity 140 of the housing 120. The first cavity 140 comprises a first region 142 which is not visible from the direction of the charging compartment 104. A second region 144 of the cavity 140 is visible from the direction of the charging compartment 104. According to the embodiment illustrated herein, upon rotation in the first direction (clockwise), the flap lock 130 and the pushing element 132 can be pivoted fully into the first region 142 of the cavity 140 such that the flap lock 130 and the pushing element 132 are not visible with the charging flap 102 open. This advantageously protects the flap lock 130 and the pushing element 132 against the elements.

Figure 5:
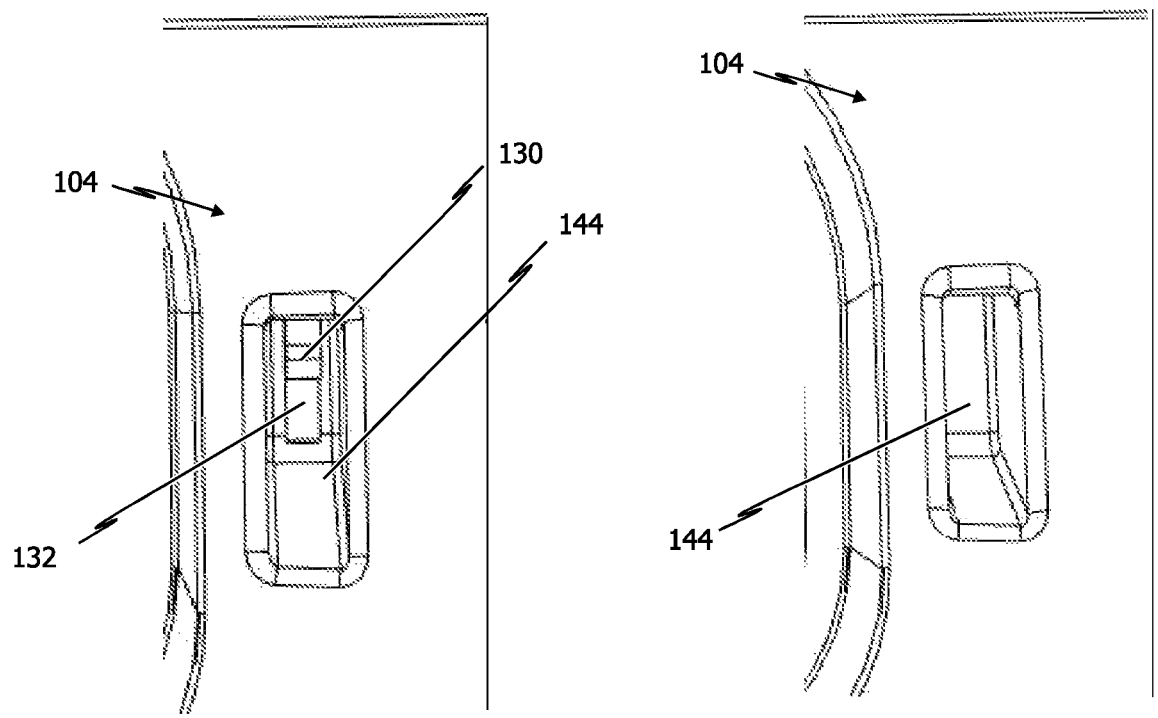
FIG. 5A a schematic front view of a charging, fueling, or service compartment having a flap lock in the locking position.
FIG. 5B a schematic front view of the charging, fueling, or service compartment according to FIG. 8A in the release position of the flap lock.
Figure 6:
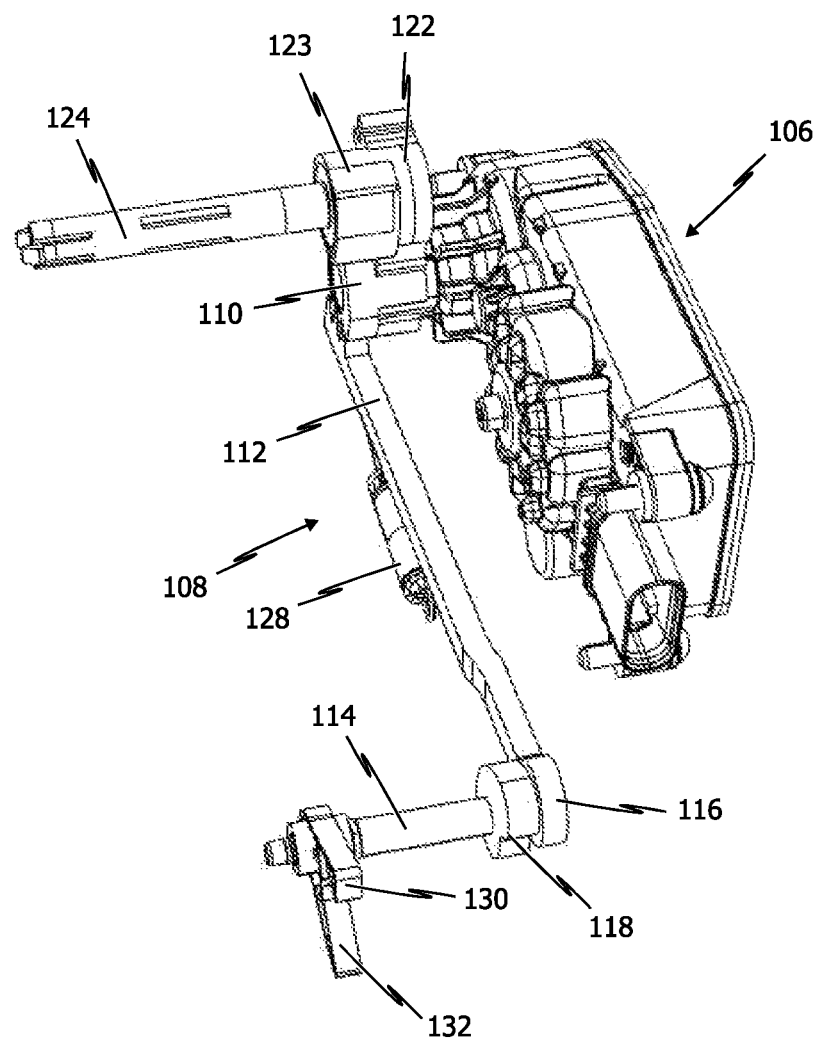
FIG. 6 a perspective view of the actuating mechanism according to FIG. 1.
Figure 7:
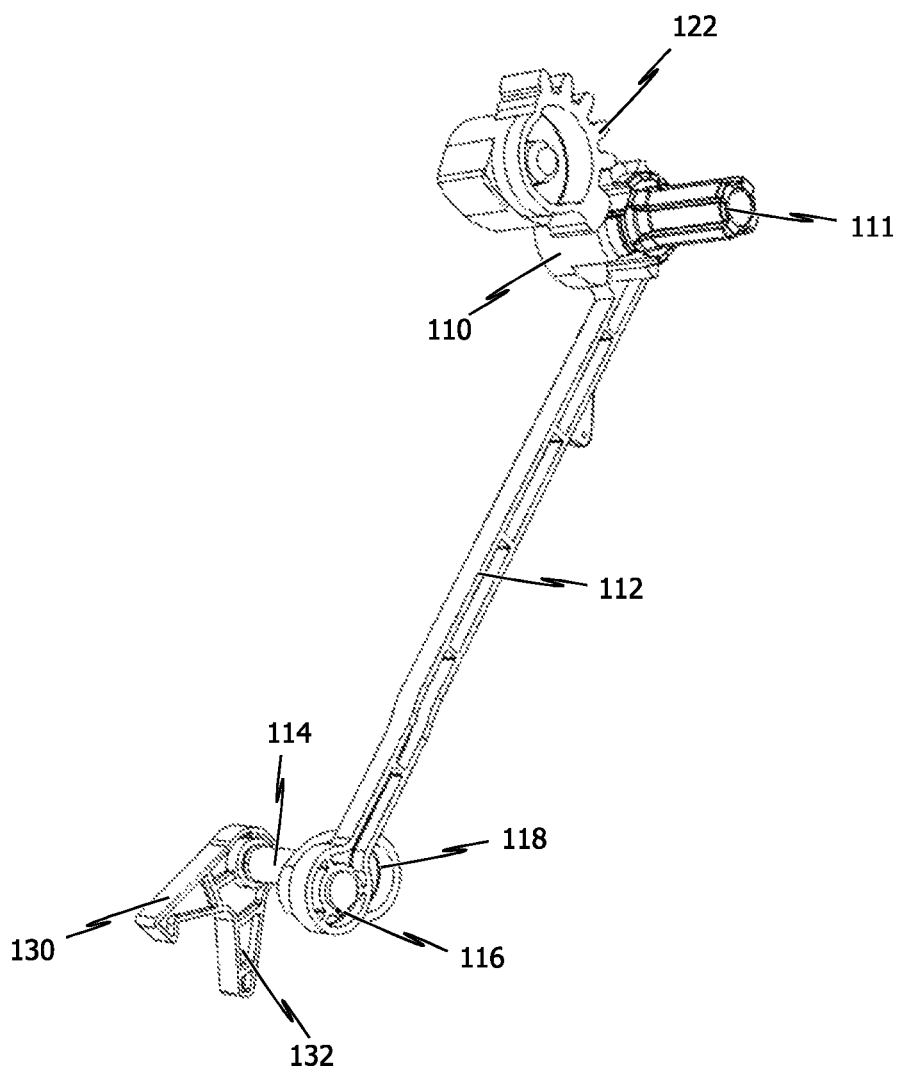
FIG. 7 a perspective view of the kinematics of the actuating mechanism according to FIG. 1.

A corresponding front view of the charging compartment 104 is shown in FIGS. 5A and 5B. It should be noted, however, that the state illustrated in FIG. 5A is usually not visible, because the charging compartment 104 is typically covered by the charging flap 102 in this configuration.

FIG. 5A shows the locking position of the flap lock 130. In this position, the flap lock 130 and the pushing element 132 are visible in the first region of the first cavity 140.

FIG. 5B shows a state with the flap open, that is to say when the flap lock and the pushing element 132 have been pivoted completely into the interior, that is to say into the first region 142 of the first cavity 140. The flap lock 130 and the pushing element 132 are not visible in this position from the direction of the charging compartment 104. The maximum pivot stroke of the flap lock 130 and the pushing element 132 in the first region 142 of the cavity 140 can be determined, for example, by the first stop 125 of the first pinion 110.

It can further be seen from FIG. 3 that a pivot arm 150 is arranged in the second cavity 146. The pivot arm 150 is substantially U-shaped in cross-section. The pivot arm 150 extends between the second transfer shaft 124 and the charging flap 102. In other words, the pivot arm 150 has a first end connected to the second transfer shaft 124 and a second end connected to a back side of the charging flap 102. The pivot arm 150 is used in particular in order to tap a rotational movement of the second transfer shaft 124 and convert it into a movement, particularly a pivoting, of the charging flap 102. In other words, the pivot arm 150 serves to transfer the charging flap 102 between its closed position shown in FIG. 3 and an open position, not shown in the figures.

As mentioned above, the second transfer shaft 124 is also driven by the rotation of the electric drive 106. Returning to the example described above, in which the first pinion 110 is rotated counterclockwise by the electric drive 106 of FIG. 2, a rotation of the second transfer shaft 124 in a clockwise direction also occurs. This occurs in particular when the teeth of the first pinion 110 come into operative connection with the teeth of the second pinion 122, and thus the rotation of the first pinion 110 is transferred to the second pinion 122 and thus to the second transfer shaft 124.

A rotation of the second transfer shaft 124 clockwise according to FIG. 3 results in the opening of the charging flap, that is to say a pivoting movement out of the closed position in the direction of the open position (not shown).

The rotational movements of the first transfer shaft 114 and the second transfer shaft 124 are synchronized via the kinematics 108. In particular, the kinematics 108 is configured such that the torque of the first drive wheel is initially only transferred to the gear rack 112 and thus only to the first transfer shaft 114 until the flap lock 130 has been transferred to its release position. As soon as the flap lock 130 has reached its release position, the torque of the first pinion 110 is also transferred to the second pinion 122 and thus to the second transfer shaft 124. In other words, a rotation of the second transfer shaft 124 and thus a pivoting of the charging flap 102 by the pivot arm 150 occurs only after the release position of the flap lock is reached. This ensures that the pivot arm 150 does not attempt to pivot the charging flap 102 while it is still locked in its closed position by the flap lock 130.

In the embodiment depicted herein, the teeth of the first pinion 110 only come into contact with the teeth of the second pinion 122 after a movement of the gear rack 112 due to the first pinion 110. In other words, the teeth of the first pinion 110 are already in contact with the teeth at the first end 113 of the gear rack 112 in the resting position (locking position) shown in FIG. 2. Conversely, the teeth of the first pinion 110 are still spaced apart from the teeth of the second pinion 122 in this position such that the second pinion 122 is initially not moved upon activation of the drive 106.

The distance between the teeth of the first and second pinions 110, 122 in the resting position is selected such that the teeth do not contact one another until after the flap lock 130 is transferred into its release position by the gear rack 112 and the first transfer shaft 114. Thus, it is ensured that the charging flap is not opened by the pivot arm 150 attached to the second transfer shaft 124 until the flap lock 130 releases the charging flap 102.

Returning to the angle or distance between the flap lock 130 and the pushing element 132, it should be mentioned that it is configured such that the pushing element 132 does not contact the locking element 134 during normal operation. Rather, the kinematics is configured such that the teeth of the first pinion 110 already hit against the teeth of the second pinion 122 before a rotation angle of the drive shaft 111 is achieved that would result in a contact of the pushing element 132 with the locking element 134 via the kinematics 108. In other words, the charging flap 102 is pivoted out of the closed position by the pivot arm before the pushing element 132 reaches the locking element 134.

In some cases (e.g., when the charging flap 102 is iced), the charging flap 102 can become stuck into the closed position. In such cases, the force of the pivot arm can be insufficient to pivot the charging flap 102. The kinematics is configured such that the drive 106 nevertheless rotates the first pinion 110 further in the first direction (counterclockwise).

Thus, in one embodiment, there is a slight (elastic) deformation of the pivot arm 150 activated by the second transfer shaft 122 due to the resistance of the stuck charging flap 102 against which the pivot arm 150 pushes. Simultaneously, the first transfer shaft 114 is further rotated so that the pushing element 132 is further moved onto the locking element 134. Because the charging flap 102 cannot be moved out of the closed position by the pivot arm 150, there is ultimately contact between the pushing element 132 and the locking element 134. From this time on, the force (the torque) of the drive is transferred to the charging flap 102 via the pushing element 132, and no further deformation of the pivot arm 150 occurs. The pushing element 132 finally breaks the icing, which allows the pivot arm 150 to move the charging flap 102 into the open position.

In a further embodiment, an overload coupling can be provided. If, in the event of a fault (for example, if the flap lock 130 is stuck), the second transfer shaft 124 is activated before the flap lock 130 has been transferred into its release position, the actuating mechanism is protected by an overload coupling 123. The overload coupling 123 can be seen, for example, in FIG. 5, which is a perspective view of the actuating mechanism 100. As shown, the overload coupling 123 is arranged between the second transfer shaft 124 and the second pinion 122. If movement of the second transfer shaft is blocked, for example, because the flap lock 130 is stuck, then the overload coupling 123 decouples the second transfer shaft 124 from the second pinion 122 as soon as a resistance against the movement of the second transfer shaft 124 exceeds a threshold value.

It should be noted, however, that the kinematics 108 is configured such that, despite exceeding the threshold value, the rotational movement of the drive 106 is still transferred to the first transfer shaft 114 by the gear rack 112. Thus, even when the charging flap 102 is stuck/iced onto the charging compartment, the flap lock 104 is released and the pushing element is activated, which, as described in conjunction with FIG. 4, pushes the charging flap 102 outwardly against the icing upon contact with the locking element 134. The pushing element 132 can thus also be understood as an "icebreaker."

As soon as the pushing element 132 has separated the charging flap 102 by pushing it down from the charging compartment 104, the resistance against the movement of the second transfer shaft 124 will also decrease below the threshold value so that the coupling reestablishes the connection between the second pinion 122 and the second transfer shaft 124. Thus, the pivot arm 150 can now pivot the charging flap 102 into its open position.

Figure 8:
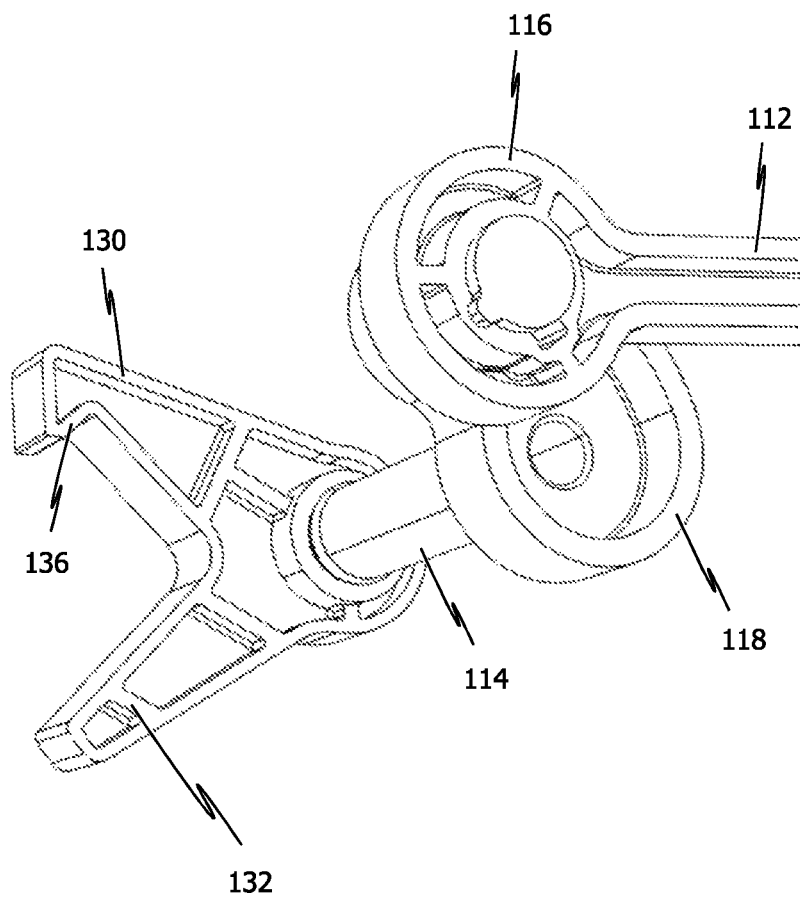
FIG. 8 a perspective, enlarged view of a flap lock.

FIG. 8 shows an enlarged view of the flap lock 130 and the pushing element 132. As mentioned above, the flap lock 130 is configured as a locking hook. Accordingly, the locking hook has an undercut 136, which operatively engages with a corresponding undercut 137 of the locking element 134 when the charging flap 102 is locked in its closed position. A contact surface 138 of the flap lock 130 lying opposite the undercut 136 is configured so as to be oriented obliquely to the opening direction of the charging flap 102 in the locking position of the flap lock 130.

The locking device 139 of the charging flap 102 has a corresponding oblique surface 139 that is also oriented obliquely to the opening direction of the charging flap 102 and substantially parallel to the surface 138 of the flap lock 130.

As indicated above, the flap lock 130 is biased into its locking position by the biasing element 128. Accordingly, when the charging flap 102 is transferred into its closed position, the oblique surface 139 of the locking device 134 of the charging flap 102 comes into contact with the oblique surface 138 of the flap lock. In particular, the oblique surface 139 of the locking device 134 contacts the oblique surface 138 of the flap lock 130 just before the charging flap 102 reaches its closed position. At this time, in order to completely close the charging flap and thus lock the charging flap 102, it is necessary to push the charging flap 102 against the biasing element 128 in the direction of the closed position.

The pressure on the charging flap 102 pushes the locking device 134 into the interior of the first cavity 140, wherein the oblique surface 139 of the locking device 134 pushes against the oblique surface 138 of the flap lock 130 and thereby slides the flap lock 130 against the force of the biasing element 128 in the direction of the release position, that is to say clockwise according to FIG. 4. As soon as the charging flap 102 has been transferred into its closed position, the two oblique surfaces 138, 139 are no longer in contact with one another, such that the flap lock 130, due to the resetting force of the biasing element 128, snaps back into the locking position shown in FIG. 4 and thus locks the charging flap 102 in its closed position.

Figure 9:
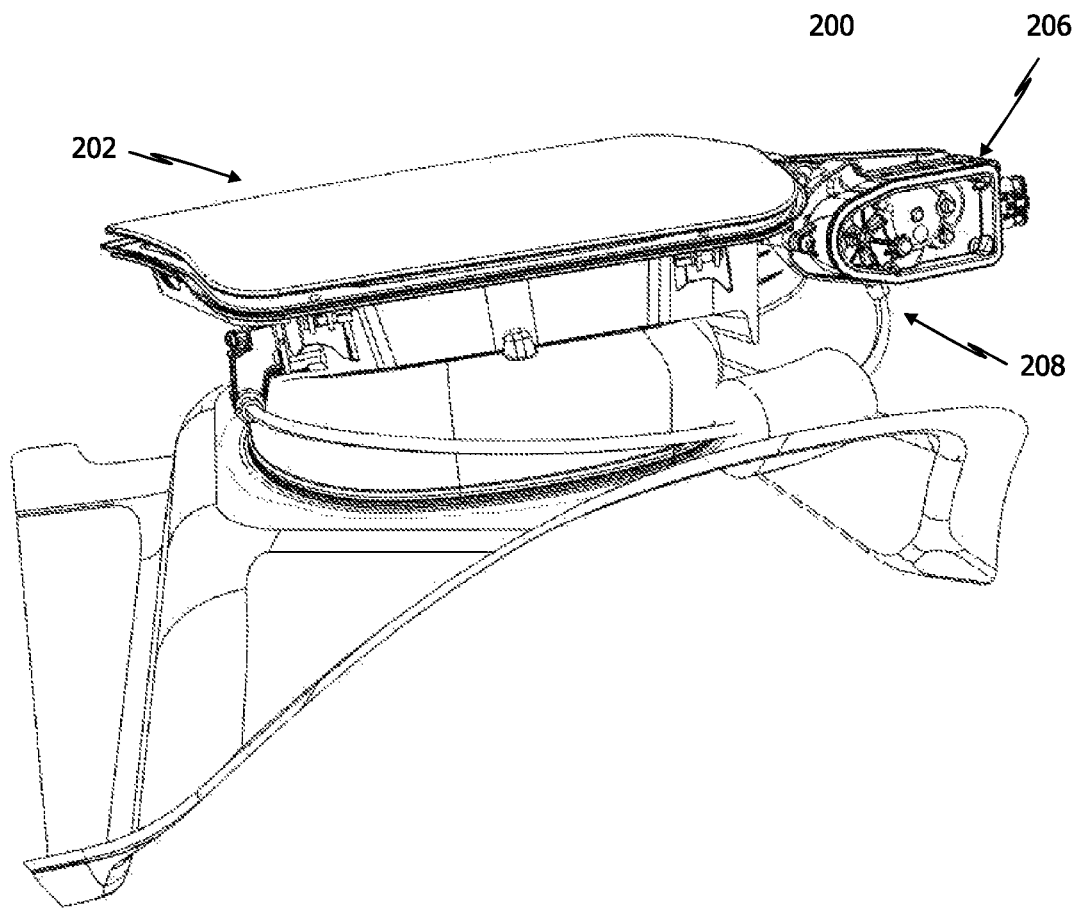
FIG. 9 a schematic perspective view of a charging flap having an actuating mechanism according to one embodiment of the present invention.

FIG. 9 shows a schematic perspective view of an actuating mechanism 200 according to a second embodiment of the present invention. The actuating mechanism 200 serves on the one hand to actuate a cover shown herein as a charging flap 202. On the other hand, the actuating mechanism 200 is also configured so as to lock the charging flap in its closed position (as shown in FIG. 9). Finally, icing of the charging flap 202 can be broken up by the actuating mechanism on the associated charging compartment (204, FIG. 12).

The actuating mechanism 200 comprises a drive, in particular an electric drive 206, which is shown herein as an electric motor. A rotation of the electric drive 206 is transferred via a kinematics 208 to the corresponding movable elements of the actuating mechanism 200, such as a flap lock and a pivot arm for the charging flap 202.

Figure 10:
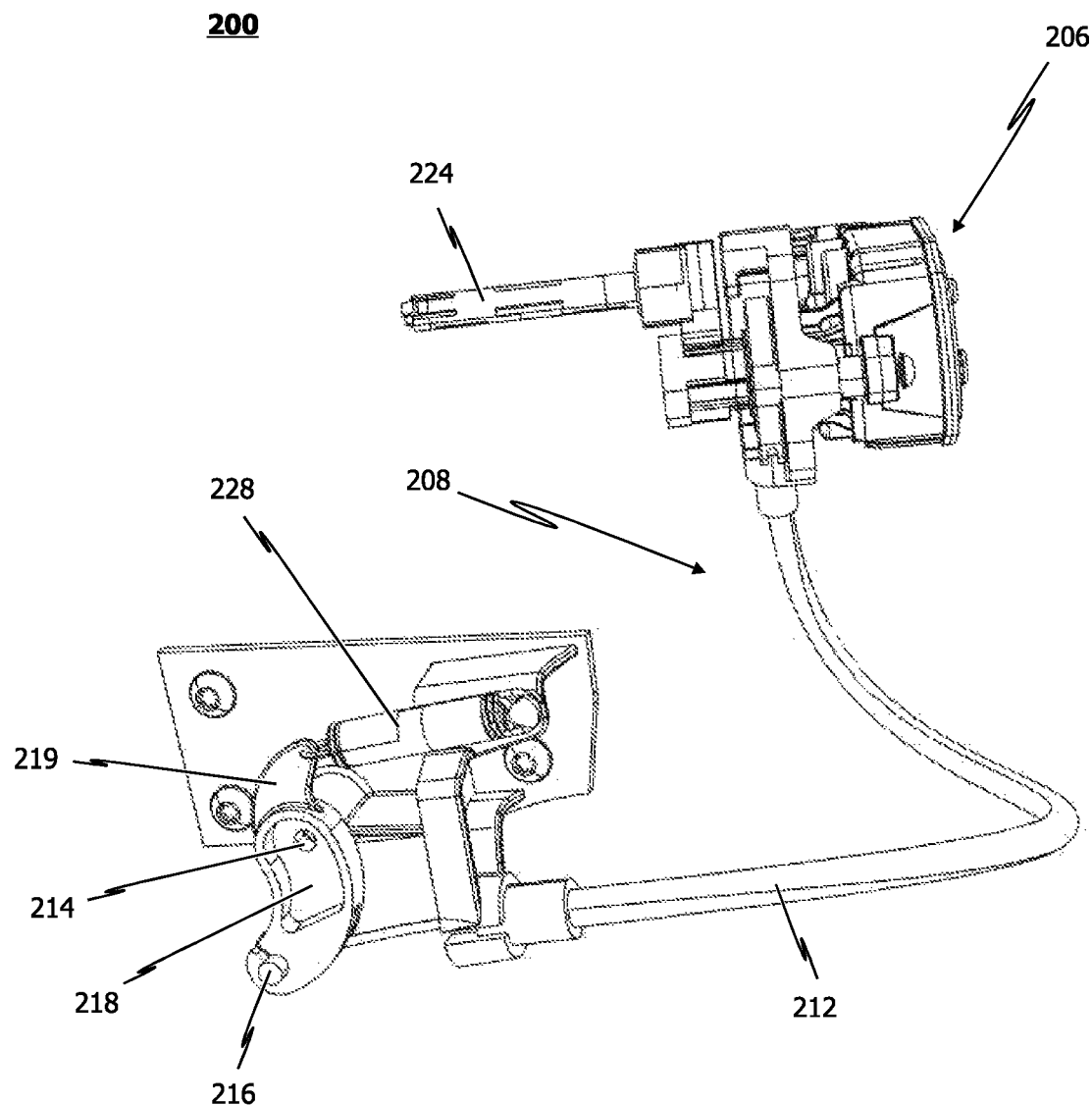
FIG. 10 a perspective view of the actuating mechanism according to FIG. 9.

A perspective view of the actuating mechanism without a charging flap can be seen in FIG. 10. The kinematics 208 of the actuating mechanism is configured so as to tap a rotational movement of the drive shaft (not shown here) when the drive is actuated and convert it into a first movement for manipulating a flap lock (230, FIG. 12) and into a second movement for moving, and in particular pivoting, the charging flap 202. For this purpose, the kinematics is configured such that the movement of the drive shaft can be transferred to two transfer shafts 214, 224. A first transfer shaft 214 serves to actuate the flap lock, which will be described in further detail below. A second transfer shaft 224 serves to drive a pivot arm, which pivots the charging flap 202 between its open and closed position.

The kinematics 208 connects the drive shaft of the drive 206 to the first transfer shaft 214 via a flexible tensile element, in particular a Bowden cable 212. The Bowden cable 212 is coupled to the DRIVE SHAFT OF THE DRIVE 206 AT A FIRST END REGION (217, FIG. 15). An opposing second end 216 of the Bowden cable 212 is connected to the first transfer shaft 214 via a lever element 218.

The lever element 218 is rotatable together with the drive shaft 214. The lever element 214 has an extension 219, which is arranged for example at the opposite end of the second end 216 of the Bowden cable 212. The extension 219 is connected to a spring element 228. At its end opposite the extension 219, the spring element is connected to the housing of the charging compartment and thus to the vehicle body.

The spring element 228 biases the lever element 218 into the home position shown in FIG. 10. In this position, the flap lock (230, FIG. 12) connected to the first transfer shaft 214 is in its locking position. As will be explained further below, by pulling on the Bowden cable 212, the lever element 218 can be rotated counterclockwise as shown in FIG. 10. Together with the lever element 218, the first transfer shaft 214 is also rotated counterclockwise. The rotation of the lever element 218 out of the home position shown in FIG. 10 occurs against the biasing of the spring element 228.

Figure 11:
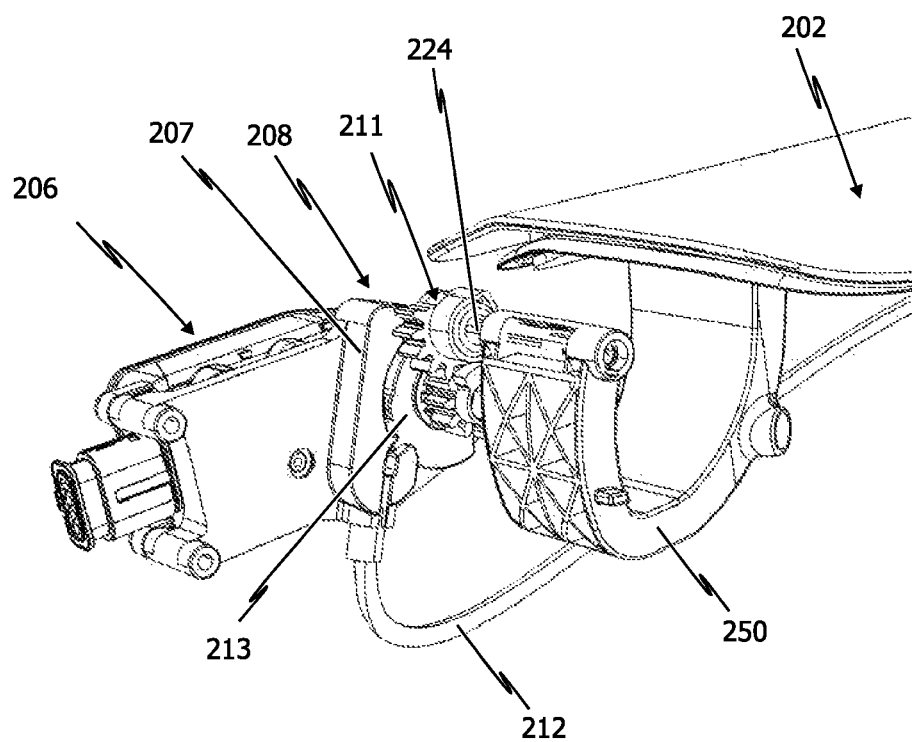
FIG. 11 a perspective view of the actuating mechanism in conjunction with a pivot arm of the charging flap according to FIG. 9

FIG. 11 shows a perspective view of the actuating mechanism in the region of the drive 206. The drive 206 shown here comprises a drive shaft (not shown), which extends through a cam washer 213 on the one hand and a first pinion of a pair of gears 211 on the other hand. The cam washer 213 is arranged on the drive shaft of the drive 206 such that it moves with the drive shaft. A guide housing 207 is further arranged on the housing of the drive 206. The guide housing 207 together with the cam washer 213 forms a guide groove (215, FIG. 15) that serves to guide the first end 217 of the Bowden cable 212 during the actuation.

The drive shaft is further connected to a pair of gears 211. A first pinion (220, FIG. 15) is arranged on the drive shaft of the drive 206 and moves along with it. The first pinion 210 is operatively connected to a second pinion 222 at predetermined times such that a rotational movement of the drive shaft 211 can be transferred to the second pinion 222. The second pinion 222 is connected to the second transfer shaft 224. A rotational movement of the second pinion results in the rotation of the second transfer shaft 224.

A pivot arm 250 of the charging flap 202 is attached to the second transfer shaft 224. Thus, a rotation of the second transfer shaft 224 causes the charging flap to be pivoted between the closed position shown in FIG. 11 and the open position (not shown here).

Figure 12:
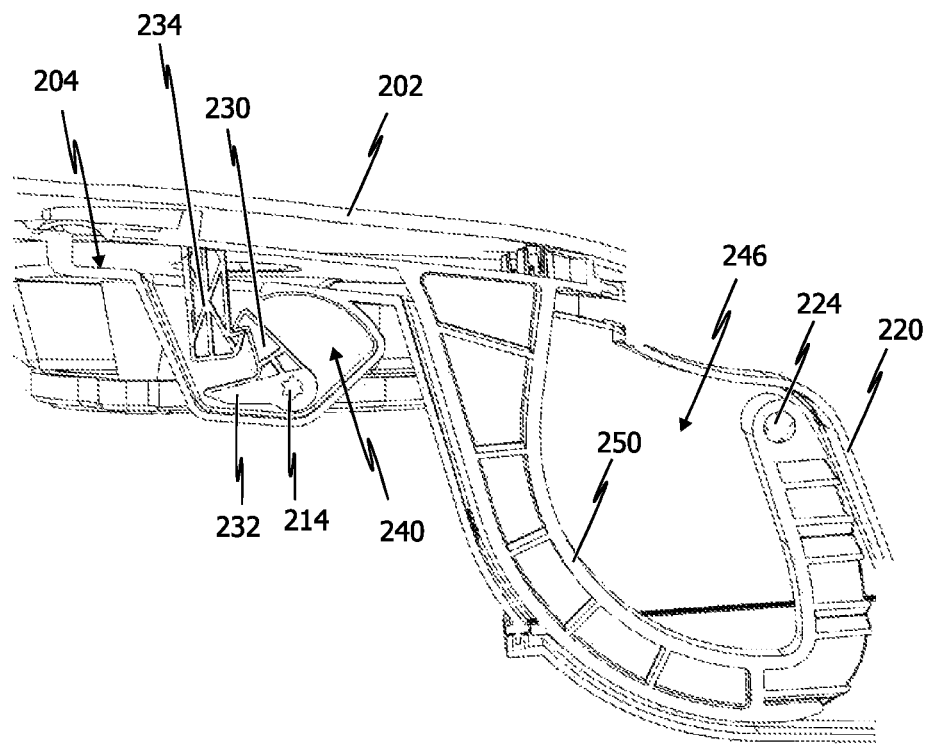
FIG. 12 a cross-section through the assembly shown in FIG. 9.

FIG. 12 shows a cross-section through a housing 220 of the actuating mechanism 200. A charging compartment 204 is provided on a front side of the housing 220. Behind the charging compartment 204, that is to say on the side of the charging compartment 204 facing away from the charging flap 204, there is a first cavity 240 for receiving a flap lock 230 and a second cavity 246 for receiving a pivot arm 250.

The flap lock 230 received in the first cavity 240 is connected to the first transfer shaft 214 and has a locking position, shown in FIG. 12, in which the flap lock 230 locks the charging flap 202 in its closed position, shown in FIG.

12. For this purpose, the flap lock 230 is connected to a locking element 234 of the charging flap 202. In particular, the flap lock 230 and the locking element 234 are each locking hooks that are operatively connected to one another in the closed position of the flap lock. The charging flap is locked in the embodiment shown in FIG. 10, that is, an opening of the charging flap 202 in the locking position is not possible without damaging the flap lock 230. However, it is also generally conceivable to align the flap lock such that it merely locks the charging flap 202 so that an opening of the charging flap 202 is also possible in the locking position without damaging the flap lock.

As indicated above in connection with FIG. 10, the flap lock 230 is biased into the locking position shown in FIG. 12 by the biasing element 228. To unlock the flap lock and thus transfer the flap lock 230 into its unlocking position, the first pinion 210 is rotated by the drive 206 in a direction counterclockwise, as shown in FIG. 10.

Returning to the illustration according to FIG. 12, it should be mentioned that a rotation of the first transfer shaft 214 in the clockwise direction also causes the flap lock 230 to be pivoted clockwise. In particular, the flap lock 230 is pivoted away from the locking element 234 of the charging flap 202 in the first direction shown as clockwise and into the interior of the first cavity 240.

By pivoting the flap lock 230 in the first direction, it is released from the locking element 234 and thus releases a movement of the charging flap 202. As soon as the flap lock 230, which is configured as a locking hook, is no longer in operative engagement with the locking element 234, the flap lock 230 has reached its release position. It should be noted that the flap lock 230 does not need to be fully rotated into the first cavity 240 in its release position. Rather, the release position of the flap lock 230 is already achieved when there is no longer any contact between the flap lock and the locking element 234.

The locking device further comprises a pushing element 232 configured so as to push the charging flap 202 out of the closed position shown in FIG. 10 away from the charging compartment 204 when the charging flap 202 is stuck in the closed position, for example when it has become iced. The pushing element 232 is also connected to the first transfer shaft 214. The pushing element is arranged on the first transfer shaft such that it only comes into contact with the locking element 234 after the flap lock 230 has already been transferred into its release position.

In particular, the pushing element 232 is formed integrally with the flap lock 230 according to the embodiment shown in the figures. Specifically, the flap lock 230 and the pushing element 232 each have a first end connected to one another and to the first transfer shaft 214.

The pushing element 232 and the flap lock 230 extend at an angle of about 90° to one another, according to the embodiment shown herein. Of course, however, it is just as conceivable to provide a larger or smaller angle. Specifically, the angle will depend on how long the pushing element 232 takes to push the charging flap 202 away from the charging compartment 204 after the flap lock 230 has reached the release position. The angle between the pushing element 232 and the flap lock 230 accordingly defines the delay between achieving the release position of the flap lock 230 and the pushing out of the charging flap 202 by the pushing element 232.

The angle between the pushing element 232 and the flap lock 230 is sized according to the illustrated embodiment such that, in normal operation, there is no contact between the pushing element 232 and the locking element 234. Rather, in normal operation, the charging flap is moved in the direction of the open position before the pushing element 232 has been rotated sufficiently far so as to contact the locking element 234, as will be explained in further detail below.

In a further embodiment (not shown), the flap lock and the pushing element can also be arranged offset from one another along the first transfer shaft, wherein the pushing element and the flap lock are still connected to and driven by the first transfer shaft, respectively.

As noted above, the flap lock 230 can be transferred by a rotation in the first direction (here, clockwise) from the locking position shown in FIG. 12 into a release position in which the flap lock 230 is no longer in contact with the locking element 234 of the charging flap 202. If the first transfer shaft 214 is moved further in the first direction (i.e., clockwise according to FIG. 12) upon reaching the release position of the flap lock 230, the flap lock 230 is pivoted even further into the interior of the first cavity 240. By rotating the transfer shaft 214 further, the pushing element 232 further moves in the direction of a face of the locking element 234 of the charging flap 202, wherein the pushing element preferably moves the locking element 234 only in case of icing (or sticking) of the charging flap.

Figure 13:
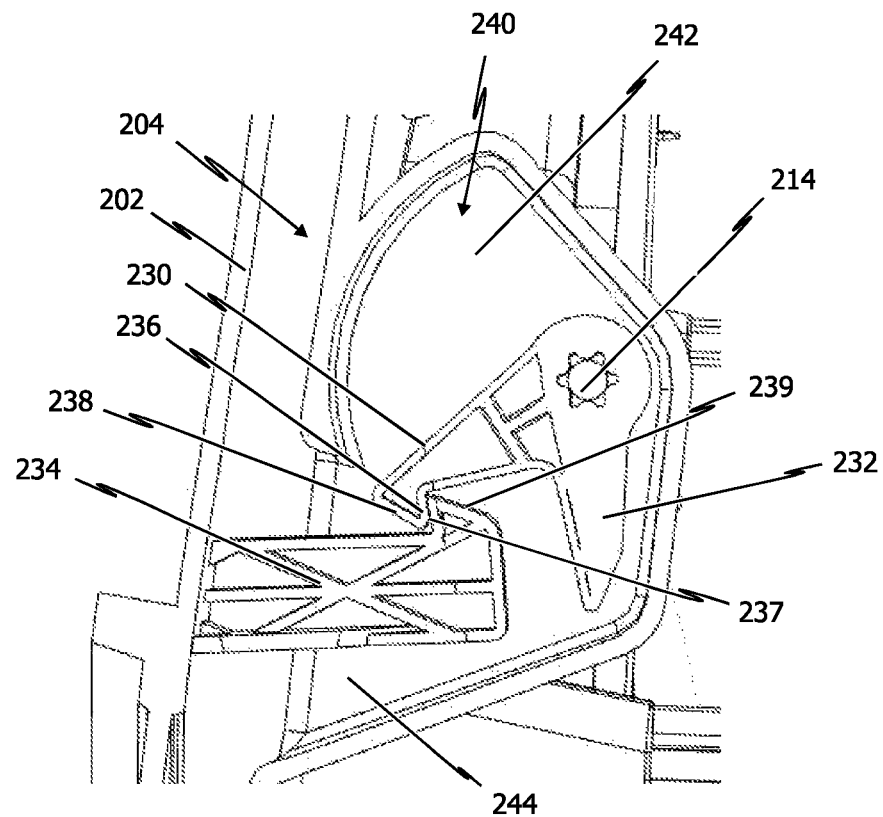
FIG. 13 an enlarged view of the flap lock according to FIG. 11.

FIG. 13 shows an enlarged view of the first cavity 240 of the housing 220. The first cavity 240 comprises a first region 242 which is not visible from the direction of the charging compartment 204. A second region 244 of the cavity 240 is visible from the direction of the charging compartment 204. According to the embodiment illustrated herein, upon rotation in the first direction (clockwise), the flap lock 230 and the pushing element 232 can be pivoted fully into the first region 242 of the cavity 240 such that the flap lock 230 and the pushing element 232 are not visible with the charging flap 202 open. This advantageously protects the flap lock 230 and the pushing element 232 against the elements.

Figure 14:
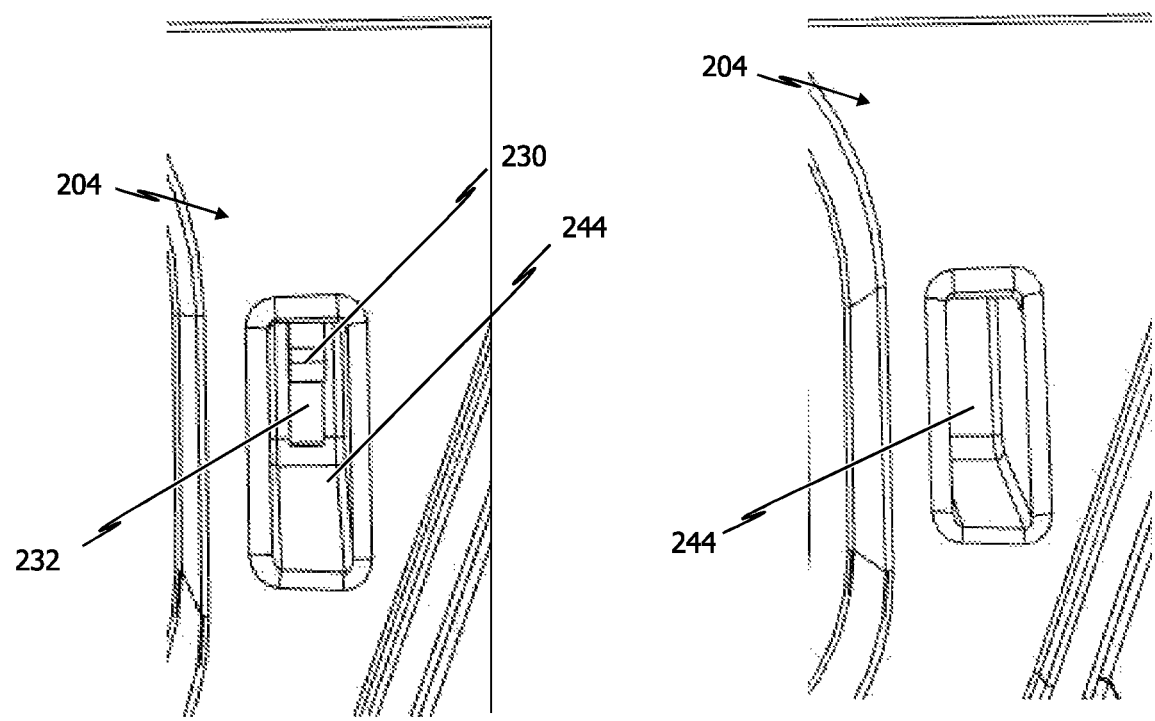
FIG. 14 a frontal view onto a portion of the charging compartment according to the embodiment of FIG. 9.

A corresponding front view of the charging compartment 204 is shown in FIG. 14. It should be noted, however, that the state illustrated on the left side of FIG. 14 is usually not visible, because the charging compartment 204 is typically covered by the charging flap 202 in this configuration.

The left side of FIG. 14 shows the locking position of the flap lock 230. In this position, the flap lock 230 and the pushing element 232 are visible in the first region of the first cavity 240.

The right side of FIG. 14 shows a state with the flap open, that is to say when the flap lock and the pushing element 232 have been pivoted completely into the interior, that is to say into the first region 242 of the first cavity 240. The flap lock 230 and the pushing element 232 are not visible in this position from the direction of the charging compartment 204. The maximum pivot stroke of the flap lock 230 and the pushing element 232 in the first region 242 of the cavity 240 can be determined, for example, by the first stop 225 of the first pinion 210.

Returning to FIG. 12, it can further be seen that a pivot arm 250 is arranged in the second cavity 246. The pivot arm 250 is substantially U-shaped in cross-section. The pivot arm 250 extends between the second transfer shaft 224 and the charging flap 202. In other words, the pivot arm 250 has a first end connected to the second transfer shaft 224 and a second end connected to a back side of the charging flap 202. The pivot arm 250 is used in particular in order to tap a rotational movement of the second transfer shaft 224 and convert it into a movement, particularly a pivoting, of the charging flap 202. In other words, the pivot arm 250 serves to transfer the charging flap 202 between its closed position shown in FIG. 13 and an open position, not shown in the figures.

As mentioned above, the second transfer shaft 224 is also driven by the rotation of the electric drive 206. Returning to the example described above, in which the first pinion 210 is rotated counterclockwise by the electric drive 206 of FIG. 10, a rotation of the second transfer shaft 224 in a clockwise direction also occurs. This occurs in particular when the teeth of the first pinion 210 come into operative connection with the teeth of the second pinion 222, and thus the rotation of the first pinion 210 is transferred to the second pinion 222 and thus to the second transfer shaft 224.

A rotation of the second transfer shaft 224 clockwise according to FIG. 12 results in the opening of the charging flap, that is to say a pivoting movement out of the closed position in the direction of the open position (not shown).

The rotational movements of the first transfer shaft 214 and the second transfer shaft 224 are synchronized via the kinematics 208. In particular, the kinematics 208 is configured such that the torque of the first drive wheel is initially only transferred to the Bowden cable 212 and thus only to the first transfer shaft 214 until the flap lock 230 has been transferred to its release position. As soon as the flap lock 230 has reached its release position, the torque of the first pinion 210 is also transferred to the second pinion 222 and thus to the second transfer shaft 224. In other words, a rotation of the second transfer shaft 224 and thus a pivoting of the charging flap 202 by the pivot arm 250 occurs only after the release position of the flap lock 230 is reached. This ensures that the pivot arm 250 does not attempt to pivot the charging flap 202 while it is still locked in its closed position by the flap lock 230.

The distance between the teeth of the first and second pinions 210, 222 in the resting position is selected such that the teeth do not contact one another until after the flap lock 230 is transferred into its release position by the gear rack 212 and the first transfer shaft 214. Thus, it is ensured that the charging flap is not opened by the pivot arm 250 attached to the second transfer shaft 224 until the flap lock 230 releases the charging flap 202.

Returning to the angle or distance between the flap lock 230 and the pushing element 232, it should be mentioned that it is configured such that the pushing element 232 does not contact the locking element 234 during normal operation. Rather, the kinematics is configured such that the teeth of the first pinion 210 already hit against the teeth of the second pinion 222 before a rotation angle of the drive shaft 211 is achieved that would result in a contact of the pushing element 232 with the locking element 234 via the kinematics 208. In other words, the charging flap 202 is pivoted out of the closed position by the pivot arm 250 before the pushing element 232 reaches the locking element 234.

In some cases (e.g., when the charging flap 202 is iced), the charging flap 202 can become stuck into the closed position. In such cases, the force of the pivot arm can be insufficient to pivot the charging flap 202. The kinematics is configured such that the drive 206 nevertheless rotates the first pinion 210 further in the first direction (counterclockwise).

Thus, in one embodiment, there is a (slight) elastic deformation of the pivot arm 250 activated by the second transfer shaft 222 due to the resistance of the stuck charging flap 202 against which the pivot arm 250 pushes. Simultaneously, the first transfer shaft 214 is further rotated so that the pushing element 232 is further moved onto the locking element 234. Because the charging flap 202 cannot be moved out of the closed position by the pivot arm 250, there is ultimately contact between the pushing element 232 and the locking element 234. From this time on, the force (the torque) of the drive is transferred to the charging flap 202 via the pushing element 232, and no further deformation of the pivot arm 250 occurs. The pushing element 232 finally breaks the icing, which allows the pivot arm 250 to move the charging flap 202 into the open position.

Figure 15:
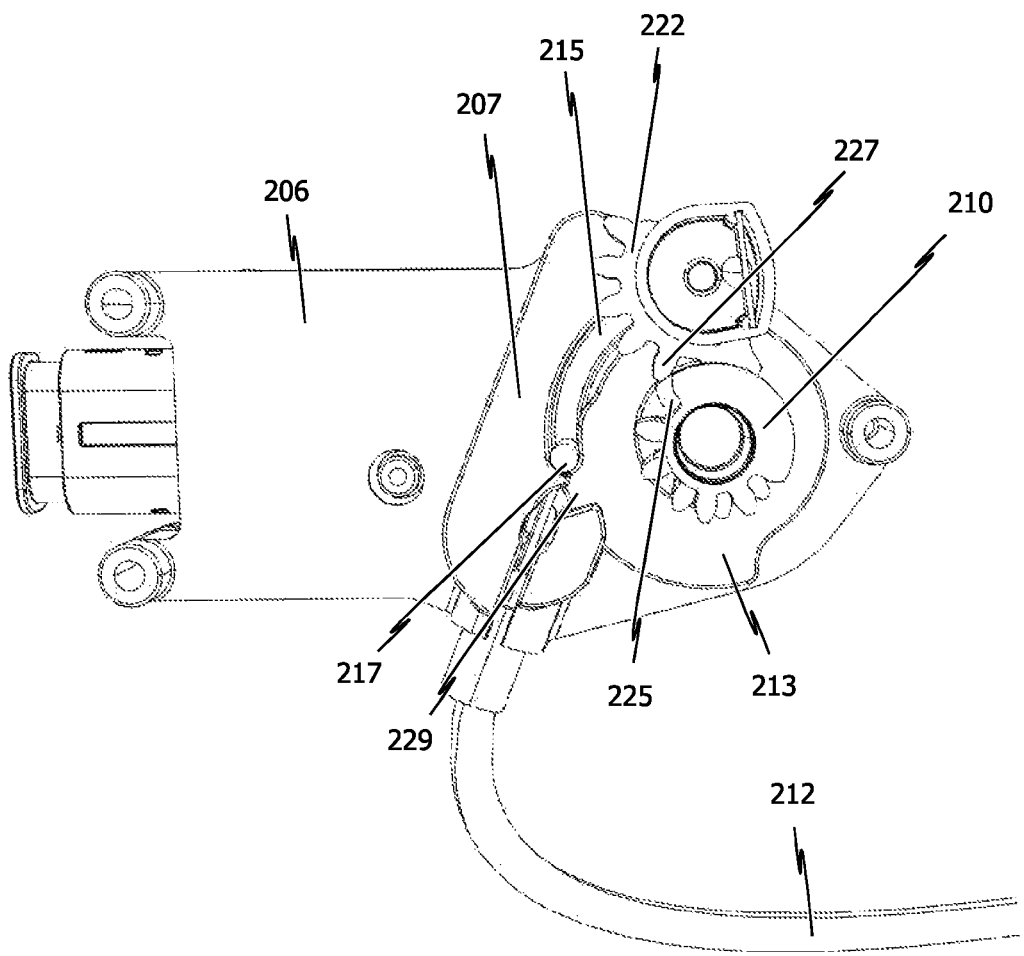
FIG. 15 a perspective view of the actuating mechanism according to FIG. 9 in the closing position of the charging flap.

FIGS. 15 to 18 show different positions of the actuating mechanism 200 during the opening movement of the charging flap 202. In particular, FIG. 15 shows a position of the actuating mechanism in which the charging flap 202 is in its closed position. At this time, no pulling force is transferred to the lever element 218 (FIG. 10) via the Bowden cable 212. Rather, the first end 217 of the Bowden cable 212 is only in contact with a cam 229 of the cam washer 213.

The drive shaft of the drive 206 (not shown here) extends through the opening of the cam washer 213 and the first pinion 210. Upon a rotation of the drive shaft clockwise in FIG. 15, the first pinion 210 as well as the cam washer 213 are also moved clockwise along with the drive shaft.

Figure 16:
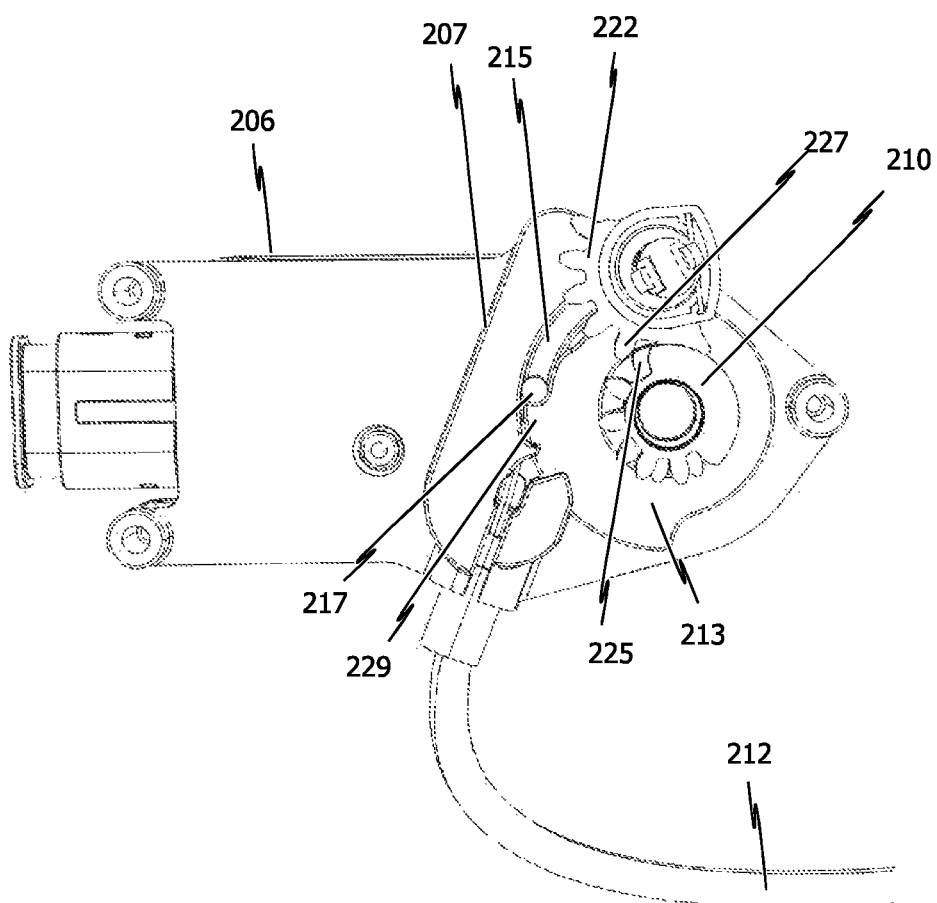
FIG. 16 a perspective view of the actuating mechanism according to FIG. 9 upon release of the flap lock.

A first clockwise movement can be seen in FIG. 16. In the position shown in FIG. 16, the first end 217 of the Bowden cable 212 has already been moved a first piece along the guide groove 215 such that a first tensile force is transferred to the lever element 218 by the Bowden cable 212. This tensile force acts counter to the biasing of the spring element 228 and pivots the lever element 218 counterclockwise in FIG. 10.

As mentioned above, a pivoting of the lever element 218 results in a rotation of the transfer shaft 214 and thus the transfer of the flap lock into its unlocking position. Also, the first pinion 210 is moved clockwise together with the drive shaft. However, because the teeth of the first pinion 210 are spaced apart from the teeth 227 of the second pinion 222 in the home position shown in FIG. 15, there is no transfer of the rotational movement of the first pinion 210 to the second pinion 222 until the unlocking position of the actuating mechanism shown in FIG. 16. Thus, during this first movement into the unlocking position of the actuating mechanism 200, i.e., until the flap lock is unlocked, there will also be no pivoting of the charging flap 202. Only in the unlocking position shown in FIG. 16 do the teeth 225 of the first pinion 210 come into contact with the teeth 227 of the second pinion 222 such that a rotational movement can be transferred to the second pinion 222 upon further rotation of the first pinion 210.

Figure 17:
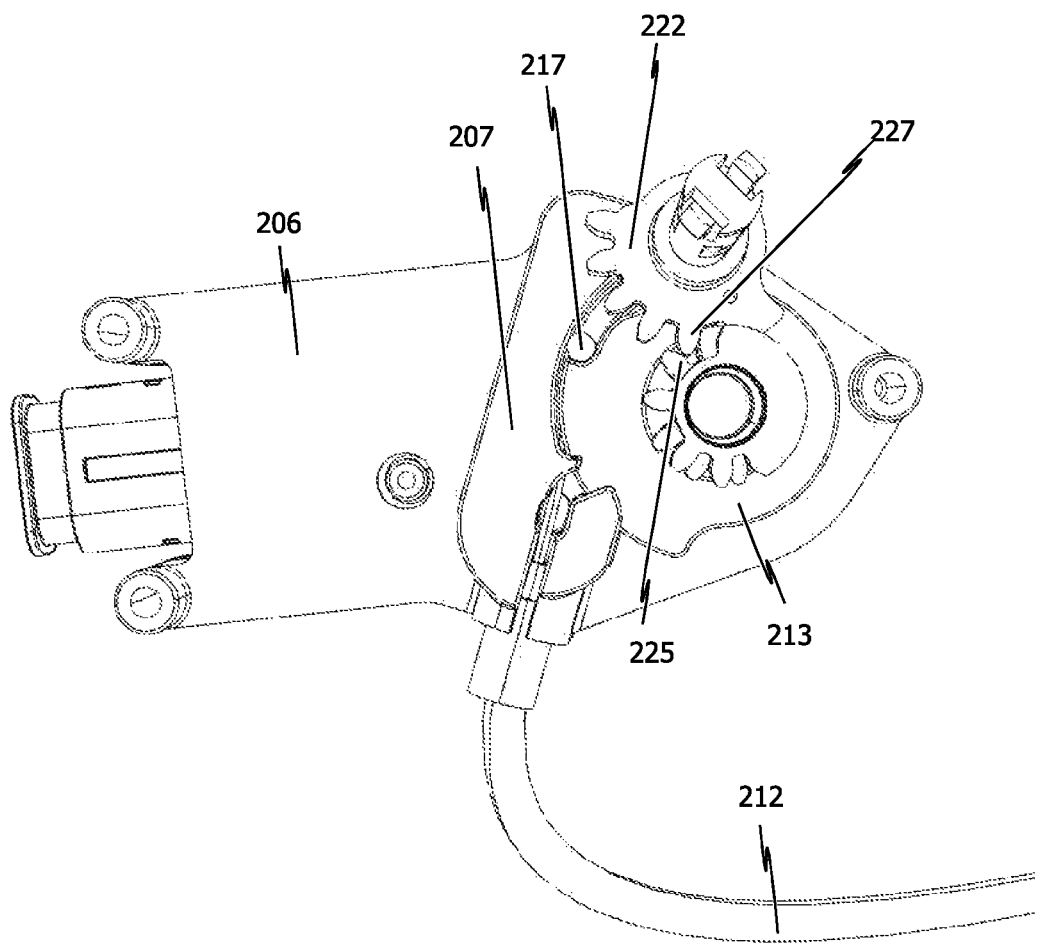
FIG. 17 a perspective view of the actuating mechanism according to FIG. 9 where the charging flap is slightly opened.

FIG. 17 shows a position of the actuating mechanism 200 in which the charging flap 202 has already been pushed out, such that a gap has opened up. If the charging flap 202 becomes stuck in its closed position, the pushing element contacts the locking element 234 just before the position shown in FIG. 17 and forces the charging flap 202 out of its closed position. However, because the teeth 225, 227 of the first and second pinions 210, 222 are already in contact with one another in the position according to FIG. 16, in normal operation, i.e., when the charging flap is not stuck, the pivoting open of the charging flap 202 occurs still before the contacting of the pushing element 232 with the charging flap 202 or locking element 234. Thus, in normal operation, the charging flap 202 comes before the pushing element 232, i.e., the pushing element 232 does not touch the charging flap in normal operation.

Figure 18:
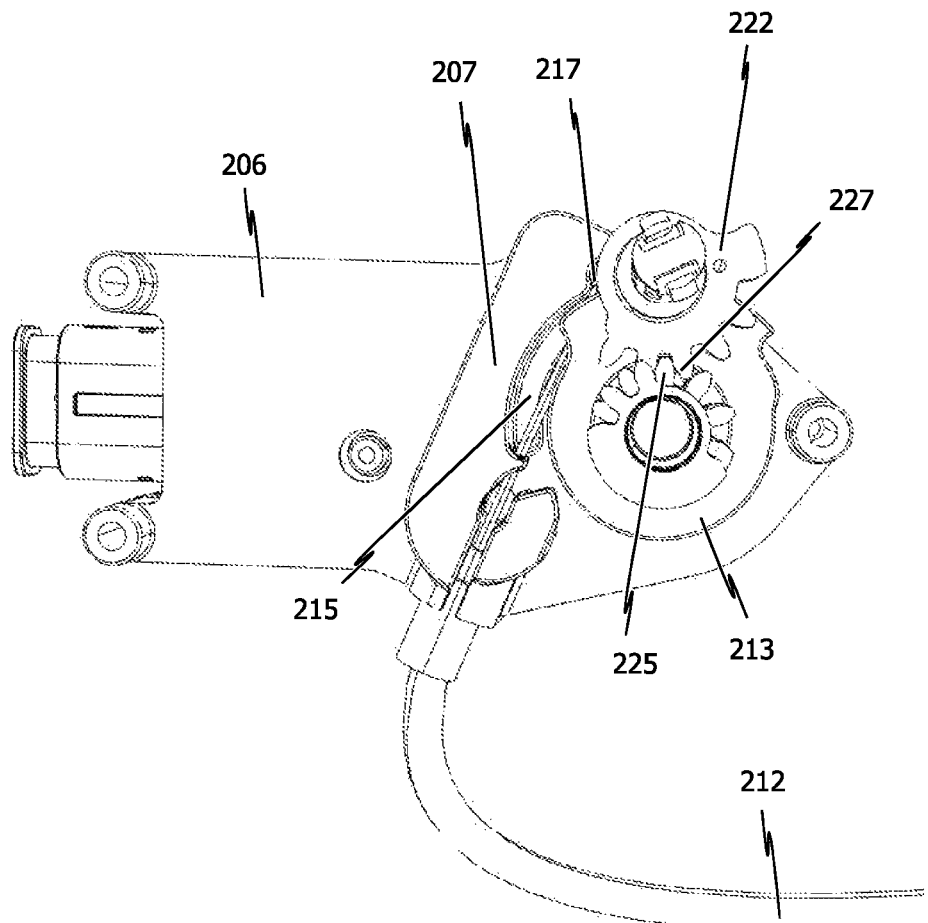
FIG. 18 the actuating mechanism according to FIG. 9 in the open position of the charging flap.

FIG. 18 shows a position of the actuating mechanism corresponding to the respective positions of the flap lock and the pushing element 230, 232 shown in FIG. 14B. In this position, the flap lock 230 is completely received in the region 240. The Bowden cable 212 is in its maximum tensile position, i.e., it is no longer possible to further pivot the lever element 218 in the position shown in FIG. 18. The rotation of the pair of gears 211 in this position has already resulted in the charging flap 202 being transferred into its open position.

The present invention is not limited to the embodiments shown in the figures, but rather results when all of the features disclosed herein are considered together.

Further unclaimed examples of the present disclosure are set forth in the clauses below:

1. A system having a charging, fueling, or service flap and a charging, fueling, or service compartment received or receivable on or in a body component of a vehicle, wherein the charging, fueling, or service flap is reversibly movable, and in particular pivotable, between a closed position and an open position relative to the charging, fueling, or service compartment, wherein a locking device is further provided, comprising the following:
   a locking hook arranged on an exterior of the charging, fueling, or service compartment and designed so as to be operatively engaged, when in the closed state of the charging, fueling, or service flap, with a locking element attached to the charging, fueling, or service flap such that the charging flap is locked in its closed position;
   a transfer shaft connected to the locking hook such that the locking hook is pivoted by a rotation of the transfer shaft, wherein the transfer shaft extends through a housing wall, between an interior and the outer side of a charging, fueling, or service compartment;

2. The system according to clause 1,
   Wherein the transfer shaft extends through the housing wall in a direction which is substantially perpendicular to a longitudinal direction of the locking hook.

3. A locking device for locking a charging, fueling, or service flap on a charging, fueling, or service compartment received or receivable on or in a body component of a vehicle, wherein the charging, fueling, or service flap is reversibly movable, and in particular pivotable, between a closed position and an open position relative to the charging, fueling, or service compartment, wherein the locking device comprises the following:
   a locking hook designed so as to be operatively engaged, when in the closed state of the charging, fueling, or service flap, with a locking element attached to the charging, fueling, or service flap such that the charging flap is locked in its closed position;
   a transfer shaft connected to the locking hook in such a manner that the locking hook is eccentrically pivoted by a rotation of the transfer shaft.

4. The locking device according to clause 3,
   wherein the locking hook comprises a locking position, in which the locking hook is operatively engaged with the locking element of the charging, fueling, or service flap, preferably in a frictionally locking manner, as well as an unlocking position, in which the locking element is movable in relation to the locking hook, wherein the locking hook can be transferred from its locking position into its unlocking position by a rotation of the transfer shaft in a first direction.

5. The locking device according to clause 4,
   wherein the locking device comprises a pushing element connected to the transfer shaft and configured so as to push the charging, fueling, or service flap out of its closed position away from the charging compartment upon rotation of the transfer shaft in the first direction counter to the first direction, in particular after the locking hook is transferred into its unlocking position.

6. The locking device according to clause 5,
   wherein the pushing device and the locking hook are integrally formed.

7. A locking device for locking a charging, fueling, or service flap on a charging, fueling, or service compartment received or receivable on or in a body component of a vehicle, wherein the charging, fueling, or service flap is reversibly movable, and in particular pivotable, between a closed position and an open position relative to the charging, fueling, or service compartment, wherein the locking device comprises the following:
   a locking hook designed so as to be operatively engaged when in the closed position of the charging, fueling, or service flap, with a locking element attached to the charging, fueling, or service flap such that the charging flap is locked in its closed position;
   a transfer shaft connected to the locking hook in such a manner that the locking hook is pivoted by a rotation of the transfer shaft;
   a pushing element connected to the transfer shaft and configured so as to push the charging, fueling, or service flap out of its closed position away from the charging compartment when the locking hook is separated from the locking element.

8. The locking device according to clause 7,
   wherein the locking hook comprises a locking position, in which the locking hook is operatively engaged with the locking element of the charging, fueling, or service flap, preferably in a frictionally locking manner, as well as an unlocking position, in which the locking element is movable in relation to the locking hook, wherein the locking hook can be transferred from its locking position into its unlocking position by a rotation of the transfer shaft in a first direction.

9. The locking device according to clause 8,
   wherein the pushing element is connected to the transfer shaft such that and configured so as to push the charging, fueling, or service flap out of its closed position away from the charging compartment upon rotation of the transfer shaft in the first direction, in particular after the locking hook has been transferred into its unlocking position.

10. The locking device according to clause 9,
    wherein the pushing device and the locking hook are integrally formed.

11. An actuating mechanism for actuating a charging, fueling, or service flap on a charging, fueling, or service compartment received or receivable on or in a body component of a vehicle, wherein the charging, fueling, or service flap is reversibly movable, and in particular pivotable, between a closed position and an open position relative to the charging, fueling, or service compartment, wherein a flap lock is further provided for locking the charging, fueling, or service flap in its closed position, wherein the actuating mechanism comprises the following:
    a drive, in particular in the form of an electric motor, having a transfer shaft; and
    a kinematics associated with the drive and configured so as to tap a rotational movement of the transfer shaft when the drive is actuated and convert it into a first movement for manipulating, and in particular pivoting, the charging, fueling, or service flap and into a second movement for manipulating the flap lock.

12. The actuating mechanism according to clause 11,
    wherein the kinematics is configured so as to convert the rotational movement tapped by the transfer shaft into the first movement upon actuation of the drive such that the charging, fueling, or service flap is moved, and in particular pivoted, in a non-linear manner relative to the charging, fueling, or service compartment.

13. The actuating mechanism according to clause 11 or 12,
    wherein the kinematics is configured so as to convert the rotational movement tapped by the transfer shaft into the first movement upon actuation of the drive such that, upon transfer of the charging, fueling, or service flap from its closed position into its open position, the charging, fueling, or service flap is moved, and in particular pivoted, initially relatively slowly and subsequently relatively quickly relative to the charging, fueling, or service compartment.

14. The actuating mechanism according to any one of clauses 11 to 13,
    wherein the kinematics is configured so as to convert the rotational movement tapped by the transfer shaft into the first movement upon actuation of the drive such that, upon transfer of the charging, fueling, or service flap from its open position into its closed position, the charging, fueling, or service flap is moved, and in particular pivoted, initially relatively quickly and subsequently relatively slowly relative to the charging, fueling, or service compartment.

15. The actuating mechanism according to any one of clauses 12 to 14,
    wherein, in order to convert the rotational movement tapped by the transfer shaft upon actuation of the drive into the non-linear first movement, the kinematics comprises a mechanism acting according to the knee lever principle.

16. The actuating mechanism according to clause 15,
    wherein the mechanism acting according to the knee lever principle comprises a first lever element connected to the transfer shaft and a second lever element pivotably connected to the first lever element, which second element is operatively coupled to a lever mechanism associated with the charging, fueling, or service flap via a gearing mechanism, in particular a gear train.

17. The actuating mechanism according to any one of clauses 1 to 16,
    wherein the flap lock comprises a locking element that can be manipulated by the kinematics and a locking portion connected to the charging, fueling, or service compartment, wherein, in a locking position, the locking element engages with the locking portion, and wherein, in a release position, the engagement is released.

18. The actuating mechanism according to clause 17,
    wherein the kinematics comprises a lever element associated with the locking element and connected to the transfer shaft, which lever element is operatively connected to the locking element via a lever mechanism such that, upon actuation of the drive and when the charging, fueling, or service flap is transferred from its closed position into its open position, the locking element is moved into its release position.

19. The actuating mechanism according to clause 18,
    wherein the lever mechanism is configured such that, upon the transfer of the locking element into the release position, the operative connection between the lever mechanism and the lever element associated with the locking element is released.

20. The actuating mechanism according to clause 18 or 19,
    wherein the lever mechanism is associated with a biasing element, in particular in the form of a spring, via which the lever mechanism with the locking element is biased into a home position in which the lever mechanism and the locking element are located when the charging, fueling, or service flap is in its locked, closed position.

21. The actuating mechanism according to clause 20,
    wherein, after releasing the operative connection between the lever mechanism and the lever element of the lever mechanism associated with the locking element, the lever mechanism with the locking element moves into the home position.

22. The actuating mechanism according to clause 21,
    wherein, upon transfer of the charging, fueling, or service flap from the open position into the closed position, the lever element associated with the locking element moves the lever mechanism with the locking element counter to the biasing force of the biasing element and thus moves the locking element in the direction of the charging, fueling, or service flap.

23. A system having a charging, fueling, or service flap and a charging, fueling, or service compartment received or receivable on or in a body component of a vehicle, wherein the charging, fueling, or service flap is reversibly movable, and in particular pivotable, between a closed position and an open position relative to the charging, fueling, or service compartment, wherein a locking device is further provided, comprising the following:
    a locking hook arranged on an exterior of the charging, fueling, or service compartment and designed so as to be operatively engaged, when in the closed state of the charging, fueling, or service flap, with a locking element attached to the charging, fueling, or service flap such that the charging flap is locked in its closed position;
    a transfer shaft connected to the locking hook such that the locking hook is pivoted by a rotation of the transfer shaft, wherein the transfer shaft extends through a housing wall, between an interior and the outer side of a charging, fueling, or service compartment;
    a sealing element arranged between the transfer shaft and the housing wall of the charging, fueling, or service compartment.

24. The system according to clause 232,
    wherein the transfer shaft extends through the housing wall in a direction which is substantially perpendicular to a longitudinal direction of the locking hook.

25. A locking device for locking a charging, fueling, or service flap on a charging, fueling, or service compartment received or receivable on or in a body component of a vehicle, wherein the charging, fueling, or service flap is reversibly movable, and in particular pivotable, between a closed position and an open position relative to the charging, fueling, or service compartment, wherein the locking device comprises the following:

a locking hook designed so as to be operatively engaged when in the closed state of the charging, fueling, or service flap, with a locking element attached to the charging, fueling, or service flap such that the charging flap is locked in its closed position;

a transfer shaft connected to the locking hook in such a manner that the locking hook is eccentrically pivoted by a rotation of the transfer shaft.

26. The locking device according to clause 25, wherein the locking hook comprises a locking position, in which the locking hook is operatively engaged with the locking element of the charging, fueling, or service flap, preferably in a frictionally locking manner, as well as an unlocking position, in which the locking element is movable in relation to the locking hook, wherein the locking element can be transferred from its locking position into its unlocking position by a rotation of the transfer shaft in a first direction.

27. The locking device according to clause 26, wherein the locking device comprises a pushing element connected to the drive shaft and configured so as to push the charging, fueling, or service flap out of its closed position away from the charging compartment upon rotation of the transfer shaft in a second direction counter to the first direction.

28. The locking device according to clause 27, wherein the pushing device and the locking hook are integrally formed.

What is claimed is:

1. A locking device for locking a charging, fueling, or service flap on a charging, fueling, or service compartment received or receivable on or in a housing, wherein the charging, fueling, or service flap is reversibly movable, between a closed position and an open position relative to the charging, fueling, or service compartment, wherein the locking device comprises the following:

a flap lock for locking the charging, fueling, or service flap in its closed position, wherein the flap lock has a locking position, in which the flap lock locks the charging, fueling, or service flap, and a release position in which the charging, fueling, or service flap is moveable in relation to the flap lock;

a first transfer shaft connected to the flap lock such that the flap lock is moveable, by a movement of the first transfer shaft between the locking position and the release position;

a pushing element connected to the first transfer shaft and configured so as to push the charging, fueling, or service flap out of its closed position away from the charging compartment after the flap lock is transferred into its release position.

2. The locking device according to claim 1, wherein the flap lock is configured be transferred from its locking position into its release position by a movement of the first transfer shaft in a first direction.

3. The locking device according to claim 2, wherein the pushing element is configured so as to push the charging, fueling, or service flap out of its closed position away from the charging, fueling, or service compartment when the first transfer shaft is further moved in the first direction upon reaching the release position of the flap lock.

4. The locking device according to claim 1, wherein the pushing element and the flap lock are integrally formed.

5. The locking device according to 1, wherein the flap lock is configured as a locking hook, and wherein the locking hook is configured so as to be operatively engaged with the charging, fueling, or service flap, with a locking element of the charging, fueling, or service flap, in the locking position, in a friction-locking manner.

6. The locking device according to claim 1, wherein the locking device is associated with a biasing element, via which the flap lock is biased into the locking position.

7. The locking device according to claim 6, wherein the flap lock is arranged such that the flap lock moves in the direction of its release position when the charging, fueling, or service flap is transferred into the closed position, counter to the biasing of the biasing element, and moves into its locking position when the biasing position is reached due to the biasing of the biasing element.

8. An actuating mechanism for actuating a charging, fueling, or service flap on a charging, fueling, or service compartment received or receivable on or in a body component of a vehicle, wherein the charging, fueling, or service flap is reversibly movable, between a closed position and an open position relative to the charging, fueling, or service compartment, wherein the actuating mechanism comprises the following:

a drive, for driving a drive shaft; and a kinematics associated with the drive and configured so as to tap a rotational movement of the drive shaft when the drive is actuated and convert it into a first movement for manipulating a flap lock of the charging, fueling or service compartment and into a second movement for moving the charging, fueling, or service flap:

wherein, when manipulated by the kinematics, the flap lock moves relative to the charging, fueling or service flap.

9. The actuating mechanism according to claim 8, wherein the kinematics is configured so as to tap the rotational movement of the drive for the first movement to open the charging, fueling, or service flap only when the flap lock has been transferred into a release position by the first movement.

10. The actuating mechanism according to claim 8, wherein the kinematics is configured so as to transfer the rotational movement of the drive to a transfer shaft in order to move the flap lock between the locking position and the release position, wherein the actuating mechanism comprises a second transfer shaft, which is connectable to the charging, fueling, or service flap in such a way that the charging, fueling, or service flap is movable, by a movement, of the second transfer shaft between the closed position and the open position, and wherein the kinematics is configured so as to transfer the rotational movement of the drive to the second transfer shaft.

11. The actuating mechanism according to claim 10, wherein the kinematics comprises an overload coupling which decouples the drive from the second transfer shaft as soon as a resistance against the first movement exceeds a threshold value, and wherein the kinematics is configured so as to continue transferring the rotational movement of the drive to the first transfer shaft in the event that the threshold value is exceeded.

12. The actuating mechanism according to claim 8,
wherein the kinematics is configured such that the first movement is mechanically synchronized with the second movement.

13. The actuating mechanism according to claim 8, wherein the kinematics comprises a flexible tensile element for manipulating the flap lock.

14. The actuating mechanism according to claim 13,
wherein the flexible tensile element is configured so as to transfer the rotational movement of the drive to a first transfer shaft for manipulating the flap lock, and
wherein the actuating mechanism comprises a second transfer shaft, which is connectable to the charging, fueling, or service flap in such a way that the charging, fueling, or service flap is movable, by a movement, of the second transfer shaft between the closed position and the open position,
wherein the kinematics is configured so as to transfer the rotational movement of the drive to the second transfer shaft.

15. The actuating mechanism according to claim 14,
wherein the kinematics comprises a lever element attached to the first transfer shaft and connected to an end of the flexible tensile element remote from the drive, which lever element is configured so as to transfer a movement of the tensile element to the first transfer shaft.

16. The actuating mechanism according to claim 15,
wherein the lever element is biased into a first position corresponding to a locking position of the flap lock.

17. The actuating mechanism according to claim 13,
wherein the kinematics comprises a cam washer connected to the drive shaft and a first end of the flexible tensile element, and wherein the cam washer is configured so as to convert a rotation of the drive shaft into a tensile movement of the flexible tensile element.

18. A charging, fueling, or service flap having an actuating mechanism according to claim 8.

19. An actuating mechanism for actuating a charging, fueling, or service flap on a charging, fueling, or service compartment received or receivable on or in a body component of a vehicle, wherein the charging, fueling, or service flap is reversibly movable, between a closed position and an open position relative to the charging, fueling, or service compartment, wherein the actuating mechanism comprises the following:
a drive, for driving a drive shaft; and
a kinematics associated with the drive and configured so as to tap a rotational movement of the drive shaft when the drive is actuated and convert it into a first movement for manipulating a flap lock and into a second movement for moving the charging, fueling, or service flap;
wherein the kinematics is configured so as to tap the rotational movement of the drive for the first movement to open the charging, fueling, or service flap only when the flap lock has been transferred into a release position by the first movement.

\* \* \* \* \*